(12) United States Patent
DaCosta et al.

(10) Patent No.: US 6,826,553 B1
(45) Date of Patent: Nov. 30, 2004

(54) SYSTEM FOR PROVIDING DATABASE FUNCTIONS FOR MULTIPLE INTERNET SOURCES

(75) Inventors: Gerson Francis DaCosta, Cupertino, CA (US); Vijay Ghaskadvi, San Jose, CA (US); Rahul Bhide, Mountain View, CA (US)

(73) Assignee: Knowmadic, Inc., Santa Clara, CA (US)

( * ) Notice: Subject to any disclaimer, the term of this patent is extended or adjusted under 35 U.S.C. 154(b) by 18 days.

(21) Appl. No.: 09/715,424

(22) Filed: Nov. 16, 2000

Related U.S. Application Data

(63) Continuation-in-part of application No. 09/465,028, filed on Dec. 16, 1999.
(60) Provisional application No. 60/147,875, filed on Aug. 9, 1999, and provisional application No. 60/112,769, filed on Dec. 18, 1998.

(51) Int. Cl.[7] .............................................. G06F 17/30
(52) U.S. Cl. .......................... 707/1; 707/204; 707/10; 707/101; 715/500; 715/513; 717/143
(58) Field of Search ............................... 707/1, 10, 101, 707/204; 717/143; 715/500, 513

(56) References Cited

U.S. PATENT DOCUMENTS

| | | | | | |
|---|---|---|---|---|---|
| 5,913,214 A | * | 6/1999 | Madnick et al. | ............... | 707/10 |
| 6,009,441 A | * | 12/1999 | Mathieu et al. | .............. | 715/516 |
| 6,038,610 A | * | 3/2000 | Belfiore et al. | .............. | 719/310 |
| 6,138,129 A | * | 10/2000 | Combs | ........................... | 707/6 |
| 6,199,073 B1 | * | 3/2001 | Peairs et al. | ................. | 707/204 |
| 6,205,440 B1 | * | 3/2001 | Nusbickel | ....................... | 707/2 |
| 6,247,018 B1 | * | 6/2001 | Rheaume | .................... | 707/102 |
| 6,370,580 B2 | * | 4/2002 | Kriegsman | ................... | 709/226 |
| 6,418,471 B1 | * | 7/2002 | Shelton et al. | .............. | 709/227 |
| 6,466,940 B1 | * | 10/2002 | Mills | .......................... | 707/102 |
| 6,466,966 B1 | * | 10/2002 | Kirsch et al. | ................ | 709/203 |
| 6,525,748 B1 | * | 2/2003 | Belfiore et al. | ............. | 345/855 |
| 6,605,120 B1 | * | 8/2003 | Fields et al. | ................. | 715/513 |

* cited by examiner

*Primary Examiner*—Shahid Alam
*Assistant Examiner*—Chongshan Chen
(74) *Attorney, Agent, or Firm*—Cooley Godward LLP

(57) ABSTRACT

A system for automatically extracting data from at least one electronic document accessible through the Internet or other computer network. The system records a sequence of actions operable to electronically navigate to a target page of the electronic document, the target page including a plurality of elements each having contents and a structural definition wherein the structural definitions interrelate the plurality of elements to specify a target pattern for a select subset of the plurality of elements. After recording the navigation path and the target pattern, the system automatically accesses the target page according to the recorded sequence. When the target page is accessed, the system automatically identifies, copies and processes selections from the plurality of elements dependent upon the target pattern.

43 Claims, 20 Drawing Sheets

Recording Navagation Script - Getting to a page

Ease of Use: Build Your Own "JobFinder"

It takes just a few steps to build any Application.
For Example: Looking For a Job? Make your own JOB FINDER!

Step 1: Navigation
- Navigation: Navigate to the URL., Record and Playback the Sequence
- Extraction: How to extract specific information
- Find Text: Use Find Text to find "interesting" information

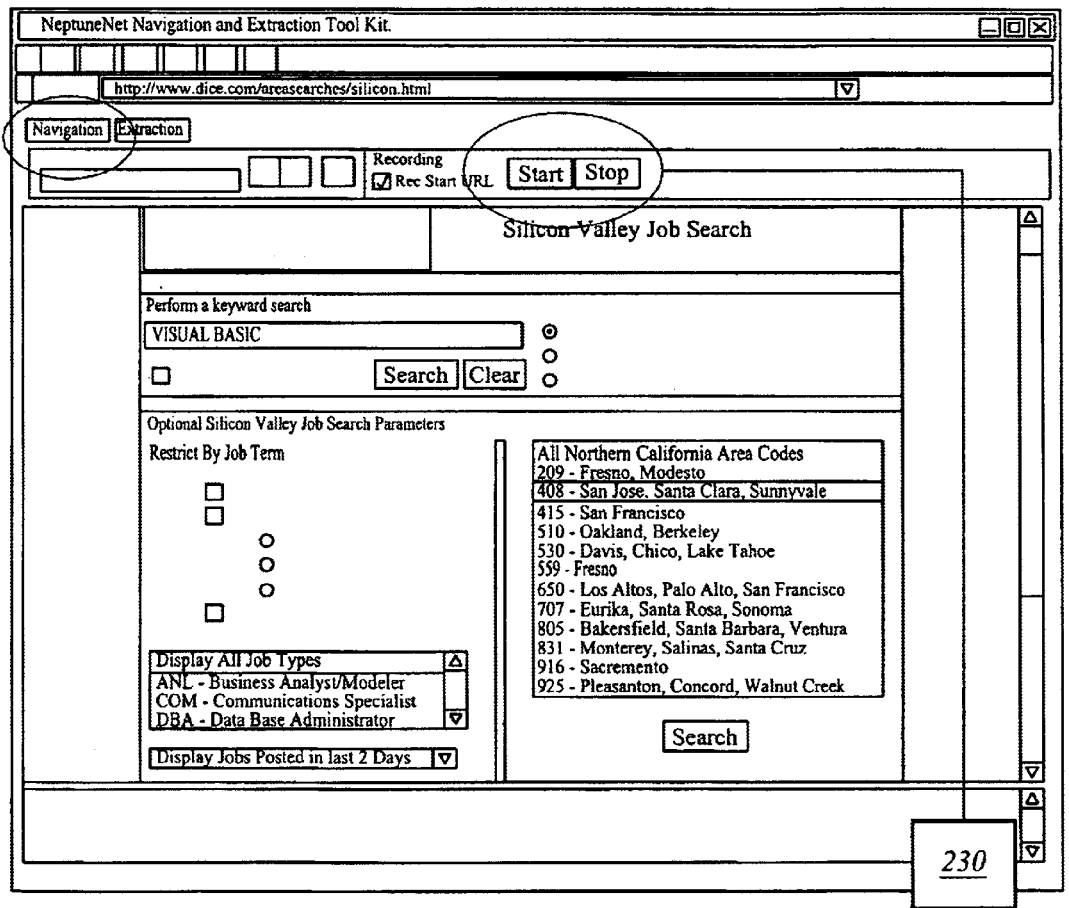

230

- Just press 'Start' button and Surf as usual.
- Your actions are recorded.
- When you are done, press 'Stop' button.

*FIG. 8*

JobFinder : Extraction

Step 2: Extraction
- Navigation: Navigate to the URL., Record and Playback the Sequence
- Extraction: How to extract specific information
- Find Text: Use Find Text to find "interesting" information

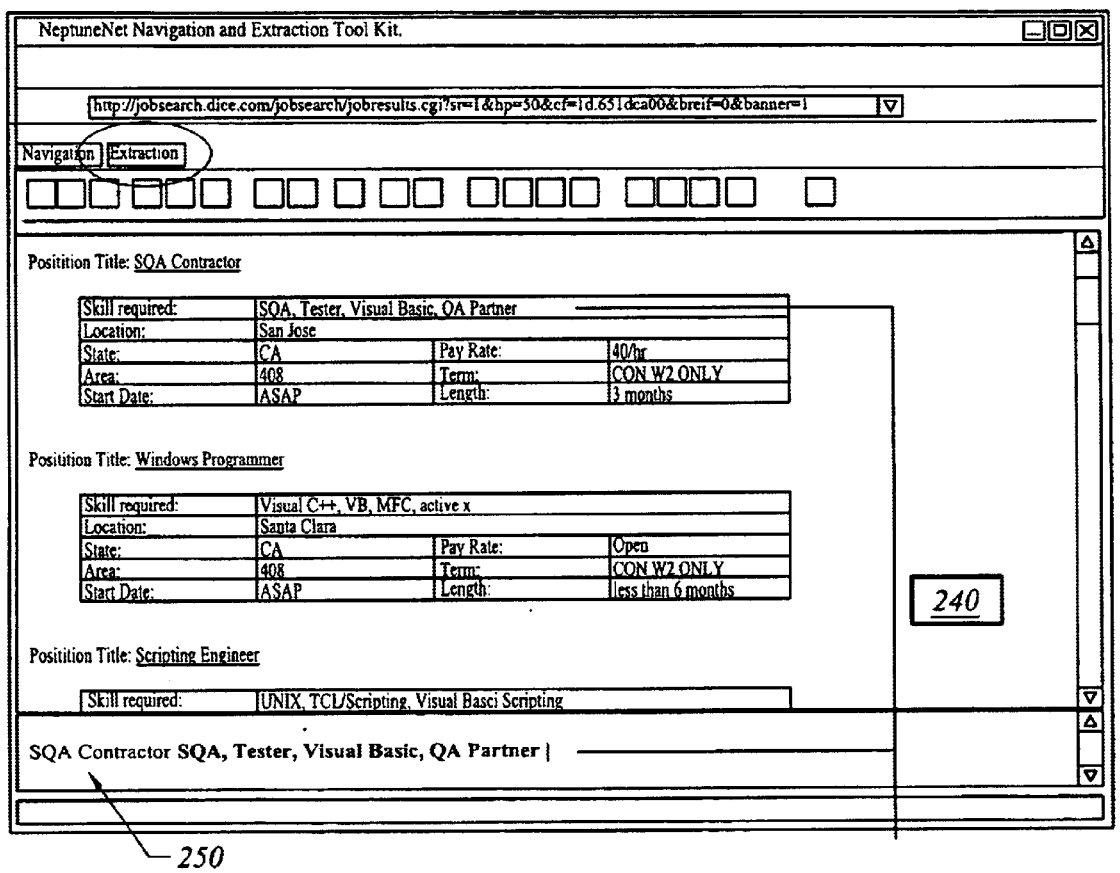

User identified data to be retrieved automatically. Recorded in lower Window.

- Just highlight the information you want to retrieve from the web page
- Click on the toolbar buttons to fine tune and record your action(s).

FIG. 9

Your JobFinder Output

Save your "script" and run it on demand. View output on your Browser.
Save it in Excel, Access or Word. Do it Every Hour - automatically.

Automatic extraction of jobs data. Data may also be transferred to a data base for SQL processing

Additional Search Tools: Find Text

- Step 3: Find Text
- Navigation: Navigate to the URL., Record and Playback the Sequence
- Extraction: How to extract specific information
- Find Text: Use Find Text to find "interesting" information

[1] Type in the string to search for, e.g. "SAP"
[2] Selection of relevant data based on Found Text: The Row

The HTML Hierarchy: A Org Chart for the Web Page

Use the Web Page Hierarchy to locate elements in that Web Page.

Example:
"Visual Basic Home Page: is a selection in the Web page. We wish to reselect it in a new web page that shares the same page characteristics. By locating its parent elements, A Ancestory Tree for the page is built. This Tree is the HTML Hierarchy-an Org Chart for the page.

Using the Org Chart, one can locate the same element in another Web page that shares the same hierarchy. Later we will show how to exploit the sequence or "pattern" that exists in the Ancestory Tree..

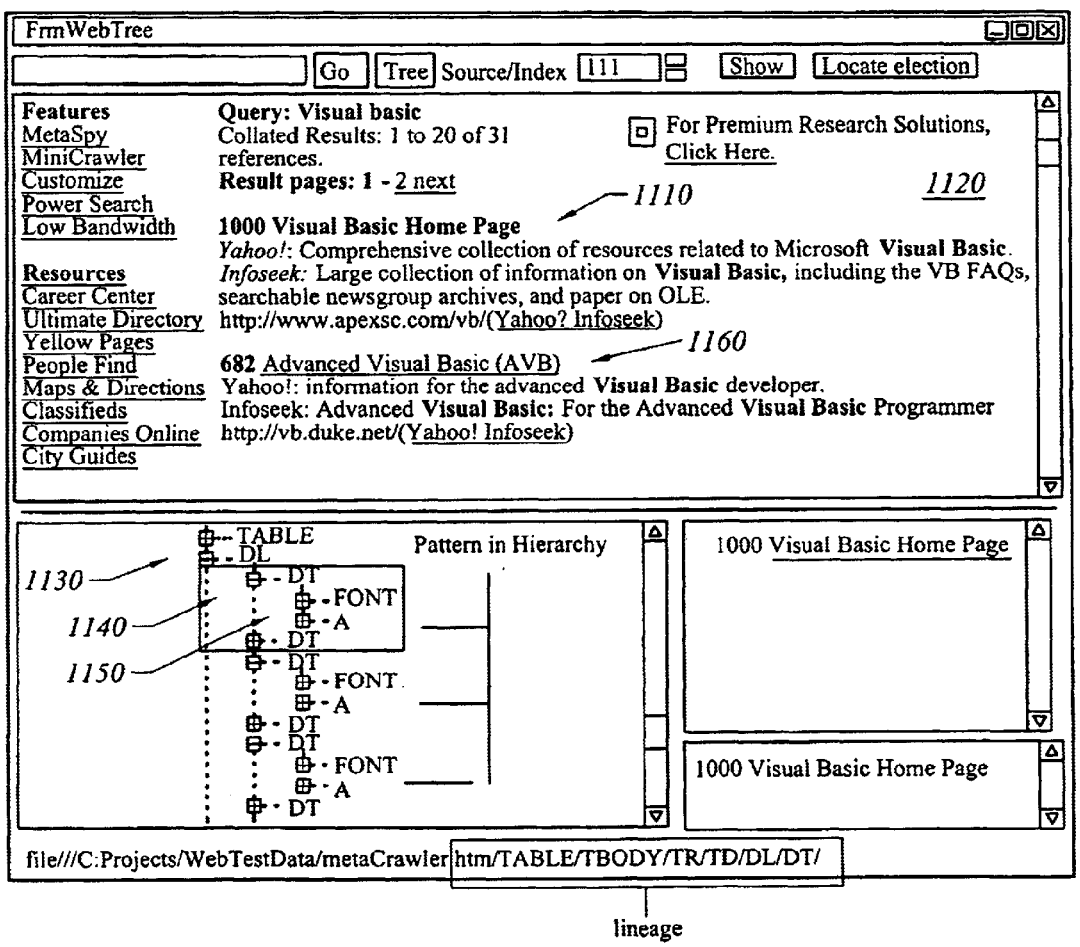

lineage

*FIG. 12*

Detail Pattern. type:CRITERIA

Criteria Match | Macro Steps | Settings

| | Criteria | Value |
|---|---|---|
| 1 | Select Tags of Type | TD |
| 2 | Filter on their Lineage | CENTER CENTER CENTER A TABLE TBODY TR TD |
| 3 | Selections to Include Text | 300L |
| 4 | Selections to Include HTML | 300L |
| 5 | Lineage must Include tags | |
| 6 | Lineage must Exclude tags | |
| 7 | Loc. Range Left | 246-246 |
| 8 | Loc. Range Height | 25-25 |

Usage: Items 2,3,4,5 may include Regular Expressions:<REGEXP>Expression
Items 2,3,4,5 may include OR Lists Sep. by | : A B CD | E F G

*FIG. 14*

| Extract | | | | |
|---|---|---|---|---|
| ⚓ Filter | ☐ Structure | | | |

Record: ☐☐🗁 ≡! 💾 ⤳ 🗂 ≣ [          ] [?] ☐ Use REgExp     Play: 📂 ▷

```
mPD4564441G5-A80-9JF 4M '4' 4125 54-pin Plastic TSOP (II)
mPD4564441G5-A10-9JF 100 (400 mil)
mPD4564441G5-A10B-9JF 100
mPD4564841G5-A80-9JF 2M '8' 4125
mPD4564841G5-A10-9JF 100
mPD4564841G5-A10B-9JF 100
mPD4564136G5-A80-9JF 1M '16' 4125
mPD4564136G5-A10-9JF 100
mPD4564136G5-A10B-9JF-100
```

| Part_Number | Organization | Frequency | Package |
|---|---|---|---|
| mPD4564441G5-A80-9JF | 4M '4'4 | 125 | 54-pin Plastic TSOP (II) |
| mPD4564441G5-A10-9JF | Blank | 100 | (400 mil) |
| mPD4564441G5-A10B-9JF | Blank | 100 | Blank |
| mPD4564441G5-A80-9JF | 2M '8' 4 | 125 | Blank |
| mPD4564441G5-A10-9JF | Blank | 100 | Blank |

18 Rows created

*FIG. 19*

SYSTEM FOR PROVIDING DATABASE FUNCTIONS FOR MULTIPLE INTERNET SOURCES

CROSS-REFERENCES TO RELATED APPLICATIONS

This application is a continuation-in-part of co-pending and commonly assigned U.S. patent application Ser. No. 09/465,028, filed on Dec. 16, 1999 entitled "METHOD OF PROVIDING DATABASE FUNCTIONS FOR MULTIPLE INTERNET SOURCES", and is related to commonly assigned United States Provisional patent application Ser. No. 60/112,769, filed on Dec. 18, 1998 entitled "METHOD OF PROVIDING DATABASE FUNCTIONS FOR MULTIPLE INTERNET SOURCES", and commonly assigned United States Provisional Patent Application Serial No. 60/147,875, filed on Aug. 9, 1999 entitled "EXTENDING BROWSER FUNCTIONALITY BEYOND HTML PAGE PRESENTATION".

FIELD OF THE INVENTION

The present invention relates to acquisition of data and, more particularly, to web browsers for the Internet, as well as to database utilities for data accessible through the Internet. Specifically, one embodiment of the present invention provides a system to navigate to one or more data sources on the Internet preferably in an automated manner, extract data irrespective of the format of that data and display, store and/or process the extracted data.

BACKGROUND OF THE INVENTION

The number of users professionally using the Internet (and particularly the "World Wide Web") as a data source, and hence analogously to a database or collection of databases, on a daily basis is increasing. The Internet has helped create rich new sources of information accessible through a ubiquitous user interface, i.e., the web browser such as those provided by Microsoft (called Internet Explorer) and Netscape (called Navigator). However, today's web merely brings up individual web pages to individual users. Unfortunately, these web pages are typically depicted as HTML "pictures" of data, and usually not the data itself. Users can easily browse information, but it is difficult to edit, analyze or manipulate the underlying data. Gleaning relevant information from individual web pages is tedious. Most web operations are largely performed manually. This is true of the input side, for example, entering uniform resource locator ("URL") specifications, login names, passwords and other access codes, profiles, queries and other inputs, as well as on the output side, for example, evaluating search results, data scraping from a web page, composing, editing and further processing data. Moreover, useful applications of information accessible through the Internet often require consolidation of data from multiple sources. Professional web users currently lack tools that are standard on modern databases, and, accordingly, a substantial amount of time is spent performing mundane manipulations with repetitive and less than systematic inputs.

One of the reasons why standard database tools cannot readily be used on the web is the fact that there is no standardized way to access data, largely because web pages are designed primarily for human, and not machine, readability. Further exacerbating the situation, data is typically not stable; i.e., even if the core information of a web page remains the same, presentation, and therefore the coding, of a page can change arbitrarily often, thus defeating any hard-coded access, search or retrieval and other techniques.

Accordingly, there is a need to overcome these problems, and an object of the present invention is to provide a data location and extraction tool capable of automated operation. A further object of the present invention is to provide a computerized tool capable of automatically navigating to a plurality of destination web sites, extracting select pieces of data therefrom, processing the extracted data and displaying the processed data in an organized format.

SUMMARY OF THE INVENTION

One embodiment of the present invention provides a system for collecting unstructured data from one or more web sites on the Internet and providing structured data, for example, to navigate to multiple web sites and extract data snippets. The system in accordance with one embodiment of the present invention enables the process of collecting such data to be automated so that one or more target data sources can be constantly monitored. In accordance with a preferred embodiment of the present invention, the data location and scraping tool of the present invention comprises a browser plug-in to facilitate data collection, for example, scripts are added to the browser such as Microsoft Internet Explorer. Thus, the browser effectively serves as the operating system, and the scripts embedded in the browser form an input layer that locates and extracts data and effectively serves as a BIOS for retrieval of unstructured data. The data can be simply displayed or imported and stored in a database, for example, or can be further processed, for example, using a spreadsheet application, and even imported directly to one or more applications.

The system of the present invention performs the tasks of precisely locating and extracting the select data with a granularity specified by the user from any information source such as search engine results, web pages, other web-accessible documents, e-mail or text feeds in any format, for example, HTML, .txt, .pdf, Word, Excel, .ppt, .ftp text feeds, databases, XML and other standard, as well as non-standard, formats. The system scrapes or transforms the information into a format that is understood by database-centric machines. Transformation may involve the intermediate step of first converting non-HTML to HTML, or in some cases, for example, in the case of a .pdf document, a browser plug-in is preferably provided to convert directly to XML without that intermediate step. Preferably, the system in accordance with the present invention converts information to "XMLized" snippets of valuable data gleaned by meta-surfing through one or more web pages or other web-accessible documents. Thus, the system in accordance with the preferred embodiment of the present invention enables conversion of any web page or web-accessible document in any format in any location into a usable XML snippet of relevant data. The XML tagged data will in turn be database friendly and in a form that is easily integrated into existing business processes.

The system of the present invention preferably comprises a navigation module that accesses one or more web pages or other web-accessible documents. The navigation module provides the capability for a user to specify and store a procedure such as a series of clicks and entries of information, for example, a user name and password, to access a web page or other web-accessible document, as well as the capability to perform the procedure to actually access the web page or other web-accessible document in an automated manner. The system in accordance with the present invention also preferably comprises an extraction module that scrapes information from the accessed web page or other web-accessible document. The web page or other web-accessible document can have any format, because the extraction module has the capability for the user to identify the data to be collected, whether the data appears in HTML or other format. If the data is in HTML format, the data can be analyzed, and a scraping procedure specified by the user based on the contents, structure and formatting of the HTML web page or other web-accessible document can extract data. The user can lock onto an item of relevant data on the web page or other web-accessible document for extraction by specifying relationships of contents, structure and/or formatting within the web page or other web-accessible document such that the data can be located even if the web page or other web-accessible document is modified to some extent in the future. If the format of the web page or other web-accessible document is other than HTML, for example, a text (.txt) document, e-mail, Microsoft Excel or other legacy document, the data can first be converted to HTML using a conventional translator. If a conventional translator is not available such as in the case of .pdf, for example, a translation module comprising a visual programming interface can be used to extract relevant data. The extraction module also has the capability to scrape or harvest the data from the source that is identified by the location procedure so that data can be imported. Preferably, the data is converted to a format that provides structured data such as XML format which is standardized for use by various database and other applications so that the data can be stored or further processed as determined by the user. The system of the present invention preferably provides a visual programming interface for the user to specify the navigation procedure and the one or more items of data to extract from a web page or other web-accessible document accessed by the navigation procedure.

Accordingly, the present invention provides a method for automatically extracting data from at least one electronic document accessible over a computer network such as the Internet, the method including: recording a sequence of actions operable to electronically navigate to a target page of the electronic document, the target page including a plurality of elements each having a structural definition wherein the structural definitions interrelate the plurality of elements; identifying a target pattern for a select subset of the plurality of elements; automatically accessing the target page according to the recorded sequence; and automatically identifying and copying and/or processing select ones of the plurality of elements dependent upon the target pattern. The method and system in accordance with the various embodiments of the present invention enable extraction of data irrespective of the format of the electronic document. The data can be stored, made available for further processing or displayed such as by Web Bands so that a customized data display can be structured by the user.

In summary, the system of the present invention provides an engine for accessing data on one or more web pages or other web-accessible documents primarily intended for human readability preferably using a browser, for scraping web page or other web-accessible document data identified by a user as being relevant and for structuring the collected data so that relevant data is in a structured form that can be utilized by a microprocessor-based device. Using a convenient visual programming interface, the user can automate collection of data from the Internet and transform the data to a machine usable format such that the unstructured data available on the Internet can be stored and later processed, effectively converting document-centric information to database-centric information and thus to accessible intelligence. This enables applications to be run using the extracted data and avoids the presently required laborious manual or hard-coded inputting of information gleaned from the Internet into such applications. The result is that the user cannot only access and manipulate database-centric forms of information available within an enterprise, but also document-centric forms of information available on the Internet.

BRIEF DESCRIPTION OF THE DRAWINGS

FIG. 8 illustrates a step of a user surfing to a desired web page or other web-accessible document and recording the necessary navigation steps to get there according to the preferred embodiment of the method of the present invention.

FIG. 9 illustrates a user highlighting text to be extracted from a web page, for example, according to the preferred embodiment of the present invention.

FIG. 12 illustrates the use of a web page hierarchy, for example, according to the preferred embodiment of the present invention.

FIG. 14 illustrates a criteria pattern selection screen according to a preferred embodiment of the present invention.

FIG. 19 illustrates a final tabular (structured) form of the data.

DETAILED DESCRIPTION OF THE PREFERRED EMBODIMENTS

Figure 1:
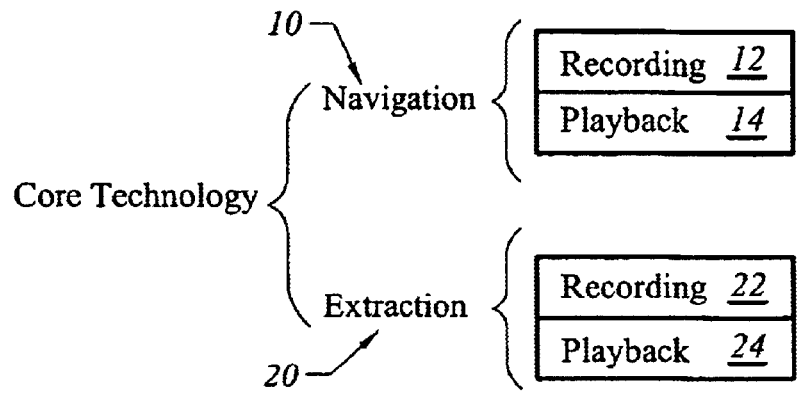
FIG. 1 illustrates a schematic overview of one embodiment of the present invention.

According to the present invention and referring now to the figures, wherein like reference numerals identify like elements of the various embodiments of the invention, one can automatically navigate to a plurality of web site destinations, extract specified information based upon taught schemas, process the extracted data according to customizable scripts, integrate information from other applications such as Microsoft ("MS") Word, Excel or Access, view the final output using a browser such as Microsoft Internet Explorer, for example, and automatically repeat these steps in a scheduled manner or when requested, for example. The key to location and extraction of data from the visual image such as a web page or other web-accessible document is typically dependent upon one or more of three salient features. The first is the structure expressed in the Document Object Model ("DOM") of a document. The second are content tags such as key word and regular expression patterns used to locate snippets. The third are formatting features such as size, location of headers or titles, underline, bold or italic "tagging" or other visual layout attributes.

Referring now to FIG. 1, one embodiment of the present invention provides a core layer on top of which automated web applications can be built. In other words, the present invention provides a tool, that can be used by developers or web users with multiple potential different interfaces, to access data available within of one or more web pages or other web-accessible documents in an automated fashion.

Considered in more detail, a navigation Application Program Interface ("API") 10 enables a client application program running on a microprocessor-based device of a user to learn and store navigation paths to given web pages or other web-accessible documents, including dialogs and forms that need to be filled in to reach those locations or sites, for example. The navigation API 10 includes a recording module 12 and playback module 14. For example, if a web site requires a user to enter a login name and password to reach an orientation page and then asks for a set of preferences to go to specific web pages or other web-accessible documents of interest, it is an object of the present invention to enable a client application to record this path once, then play it back many times including the dialog interaction with the server. In a generic example, this could allow one to record "metabookmarks", i.e., bookmarks that record not only a destination Uniform Resource Locator ("URL"), but also the required steps to navigate thereto, and play those steps back.

Additionally, as shown in FIG. 1, an extraction API 20 enables an application to robustly define data segments in a web page or other web-accessible document. Similar to the case of the navigation module 10, there are recording and playback modules 22 and 24 included in the extraction API 20. However, instead of recording/playing across web pages and web space, the extraction module 20 records and plays across elements within a single page. Artificial intelligence ("AI") techniques can be utilized to enable pattern matching to ensure that the relevant information will still be retrieved even if the page is modified (within reasonable limits, of course).

Considered in more detail, a snippet of relevant information on a web page or other web-accessible document contains structural, contents and formatting attributes. A salient feature of one preferred embodiment of the system in accordance with the present invention (referred to as Weblock) triangulates on these three attributes (structure, contents and formatting) to find and lock on to the target data. Simple web page changes are automatically handled by the triangulation system. Drastic web page changes preferably precipitate a re-teach of the extraction process, which is automatically requested if the page has changed drastically and the triangulation fails. Data confidence is therefore either 100 percent or re-teaching is employed.

For example, if a given numerical value such as a stock value appears at a certain location in a document, the system in accordance with the present invention enables an application program to retrieve it many times by playing the extraction instructions, even if its location changes because banners have been added to the top of the web page, for example. Other changes such as font, color and size can be handled as well. Moreover, the system in accordance with the present invention is preferably capable of performing some degree of learning when presented with dynamically generated web pages or other web-accessible documents (program generated pages) such as pages containing stock quotes or weather data, for example. From a few examples (preferably two), the extraction module 20 infers extraction rules and applies them to the remainder of the data in the web page or other web-accessible document. This is especially significant because the logic of the data organization is usually hidden to the user.

Additionally, multiple "web runners", each running on its own thread, can execute extraction scripts to determine if web pages or other web-accessible documents have been changed beyond recognition. Preferably, if a web page or other web-accessible document has changed dramatically, an e-mail alert is sent to any user of the script, and the script is marked with a flag. In response to the e-mail, the extraction module 20 can then be executed to re-teach the data extraction to produce a new script.

According to the present invention, data extraction rules are preferably kept separate from the extraction program itself, making it possible to update them separately. Utilizing the system of the present invention, data from different web sites can be gathered for simultaneous display in formats such as MS Word, MS PowerPoint or MS Excel, for example, or for further processing according to each user's particular needs, i.e., extraction of statistics, computations or other processing.

In summary, the navigation API 10 provides two services: recording of navigation paths 12 and playback of that which has been recorded 14. The extraction API 20 additionally provides two services: recording of extraction patterns 22 and playback of extraction patterns 24. As will be described in detail below, data in any format can be extracted.

Figure 2:
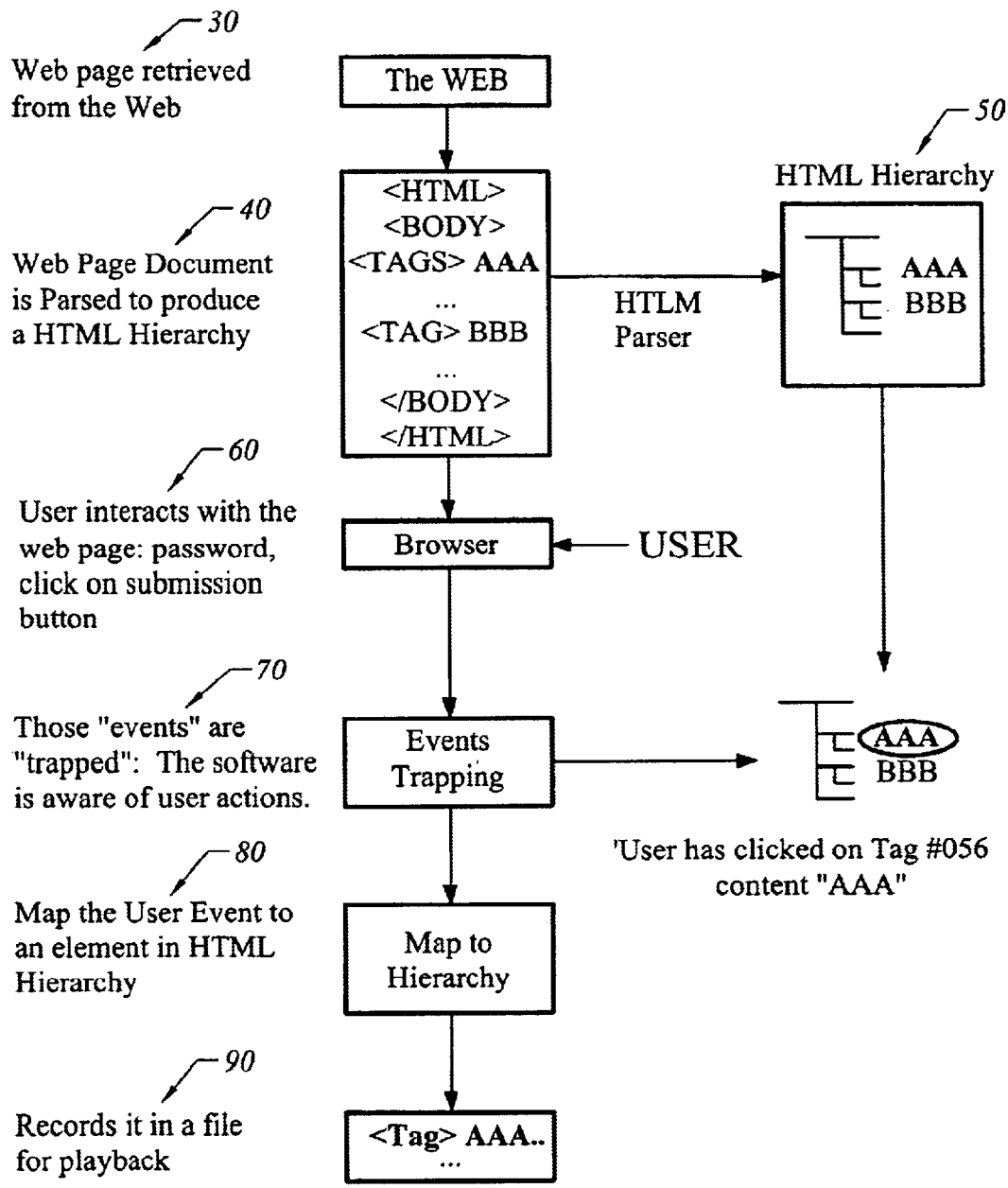
FIG. 2 illustrates a flow diagram for recording a navigation script according to a preferred embodiment of the method of the present invention.

Referring now to FIG. 2, and first to the navigation recording module 12 that records navigation paths and associated steps, each web page or other web-accessible document, for example, an HTML web page, for example, or other web-accessible document, is provided 30 to the navigation module 10 by either a web application calling the present invention (for example, as a mini-agent) or a web browser such as Microsoft Internet Explorer ("IE"), for example. Each provided HTML web page or other web-accessible document enters the navigation module 10 and is converted 40 into an element or object hierarchy. As is well known, referring, for example, to Internet Explorer for the purpose of explanation, when an HTML web page or other web-accessible document is requested, the page is transmitted from the server to an intermediate receptor as a data stream, a well-known example being Winsock. The data stream is separated and arranged into a plurality of elements configured in a well-defined hierarchy so they may be used to build the actual document displayed to the user by Internet Explorer. Hierarchy objects or elements include lists, tables, images and columns, for example. Further, these elements can be nested to provide multiple levels, for example, tables within tables and so on. As described earlier, the HTML document itself can come from either browser controls embedded within an application or from a web browser itself. This object hierarchy is cached and used during the navigation recording 50.

Once the web page or other web-accessible document has loaded, a user interacts 60 with the loaded page by clicking on or activating links or buttons, entering data and so on, as is well-known. The navigation recording module 12 captures 70 each user-generated event 60 such as clicks and keyboard inputs at the HTML level using the object hierarchy built previously (40 and 50). Thus, events are not captured at the screen level, making the recording immune to particulars of the current desktop organization, but rather defined relatively within the web page or other web-accessible document based upon the object hierarchy (i.e., using its lineage).

During the recording, the navigation recording module 12 memorizes which anchors were clicked and which forms were submitted 70 and maps 80 each user event to an element in the recorded HTML object or element hierarchy. This information is preferably stored 90 in an Extensible Markup Language ("XML") file, for example, although any suitable file format could of course be utilized. It should be understood that the use of an XML format insures portability, readability, access to the XML object model and the capability to programmatically modify the recorded path transfer. The recorded XML file preferably contains tags indicating the navigation steps and parameters entered on forms. The navigation XML file contains details about the recorded navigation in a format that can be read by the navigation playback module 14. More particularly, the navigation XML file preferably includes the series of steps that correspond to different web pages or other web-accessible documents that are loaded during the recorded initial navigation process. Each step includes information about the web page or other web-accessible document and a collection of elements that correspond to HTML elements, for example, such as hyperlinks and form fields that are acted upon. Each element includes information on how to locate the corresponding HTML element and what action to perform on or with it. Preferably, each navigation step is recorded as an XML entry in the input file.

Generally, there are two different types of steps for playback by the navigation playback module 14: form variations and URL variations. Referring first to form variations, XML encoding of a form provides key-value pairs for form parameters. These can be changed by an application, either at the XML file level by simply replacing text, or at the playback level by accessing the playback module 14 and specifying new form parameters to replace the ones originally recorded using the navigation recording module 12. This enables an application to automatically repeatedly query a web site while introducing variations. For example, a form can be filled in to get pricing information from an online bookstore for different titles by changing a single parameter in a query form. According to the present invention, form variations can be automatically used to accomplish this task. This represents a significant improvement over the prior art as multiple queries can now be automatically run based upon a single exemplematic query.

Referring to URL variations, these can similarly be applied to recorded URLs but with even more possibilities. The simplest example is the straight encoding of a URL. As is the case with form parameters, URLs can be replaced by others either at the XML file level or by direct access to the navigation playback module 14. The playback module 14 can also understand some more flexible ways of specifying anchors. An anchor can be specified relative to the structure of a document, as will be described later. For example, the playback module 14 can use specifications such as "the third anchor in the document". Also, the playback module 14 can accept specifications that are text-based such as the first anchor that contains the text "IBM".

Figure 3:
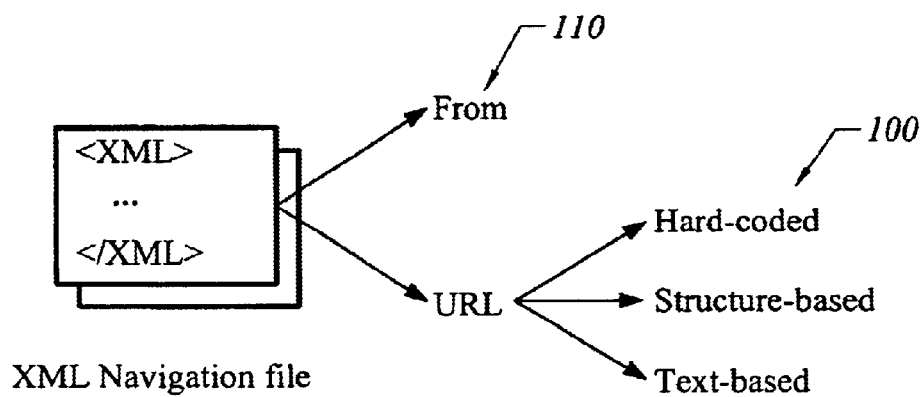
FIG. 3 illustrates an overview of stored XML files and variations in links utilized in various embodiments of the present invention.

The navigation playback module 14 uses the XML encoded navigation paths (those created during the recording phase 12 with the option of introducing multiple variations) as input files. It can then reproduce the navigation path by automatically generating clicks 100 on documents and/or submits 110 on forms specified relative to the structure of the document (referring again to the object or element hierarchy map), as shown in FIG. 3. Again, the API's 10 and 20 shown in FIG. 1 can use specifications such as "the third anchor in the document" and specifications in the contents space (text-based) such as "the first anchor that contains the word 'IBM'" to identify particular elements of the web page or other web-accessible document.

Referring to FIG. 3, as will be evident to one having ordinary skill in the art, there are generally three forms of links: hard-coded or static links; structure-based links such as the $35^{th}$ link from the top; and text-based links such as that previously described for "IBM". According to the present invention, form elements are recorded, as opposed to the "form" itself, to provide robustness. The extraction module 20 preferably looks for these elements in a web page or other web-accessible document, then goes back to the parent form and submits them. In this way, forms can be moved around in a web page or other web-accessible document that contains them, and yet the playback module 14 will still be able to identify them. Out of security considerations, the navigation files are preferably encrypted because they may contain login and password information.

A calling application can provide the required interface for variance of extraction rules. For example, if an application enables automatic navigation to a set of password-protected web sites and is intended to be used by different users, a calling application should query these users for individual passwords to provide to the playback module 14.

In summary, a navigation includes going to a starting web page or other web-accessible document, performing a series of actions such as generating clicks on hyperlinks and submitting forms, which in turn cause a target or final page to be loaded. The final or target page that is loaded represents the final step in a navigation sequence that is stored as a navigation file.

Figure 4:
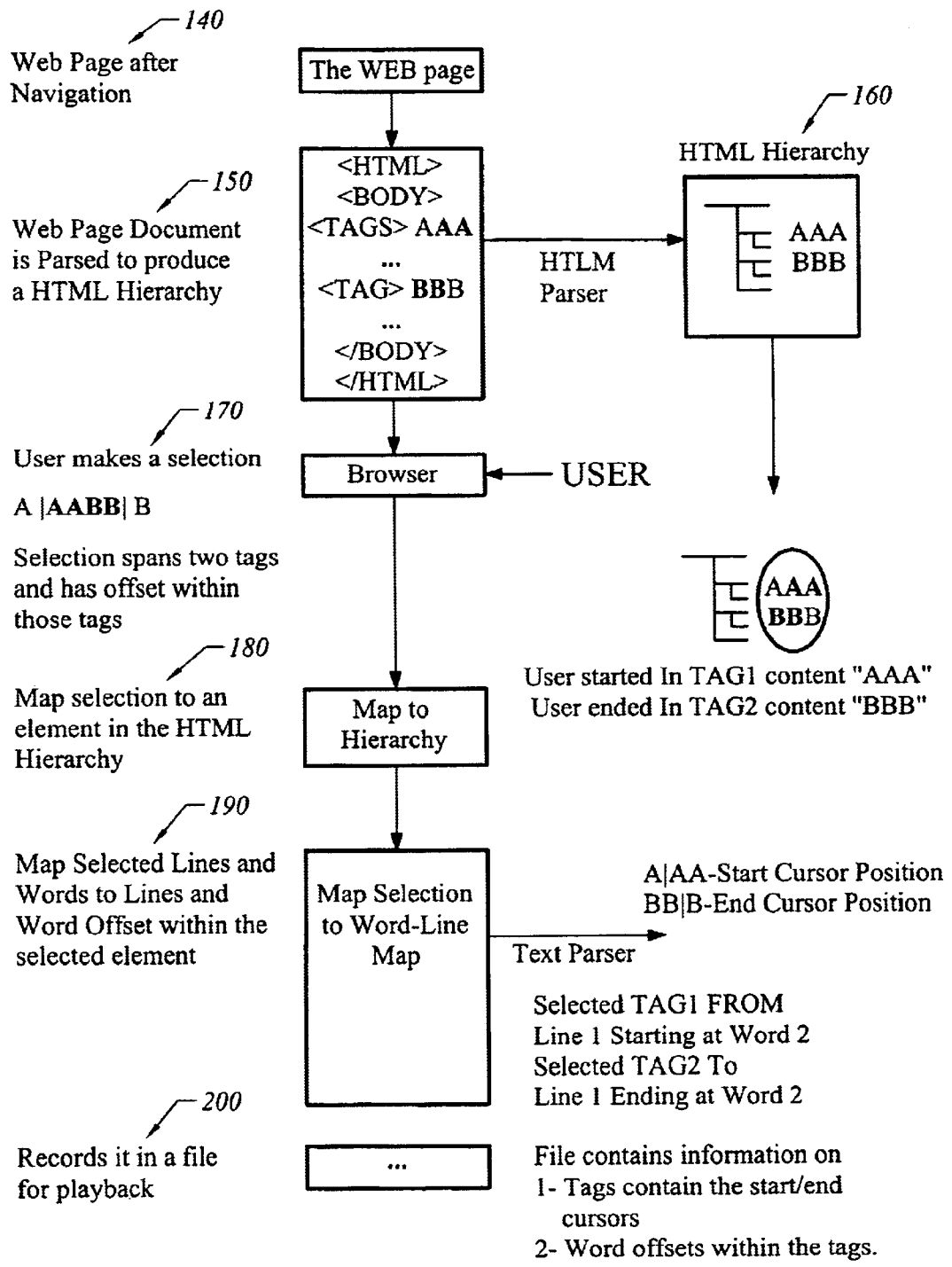
FIG. 4 illustrates a flow diagram for recording an extraction script according to a preferred embodiment of the method of the present invention.

Referring now to FIG. 4, it should be understood that while the navigation module 110 operates across multiple web pages or web space, the extraction module 20 operates at the HTML or web page or other web-accessible document level. Similar to the navigation module 10, the extraction module 20 preferably includes a recording module 22 and playback module 24. The extraction module 20 preferably follows the navigation module 10 by processing each final or target web page or other web-accessible document loaded in response to operation of the navigation module 110 to extract relevant or select information or data therefrom.

Referring first to the extraction recording module 22, it accepts as input text selections within an HTML page, for example. A pattern is identified from these selections according to which data will be extracted using the extraction playback module 24. Preferably, two selections are considered; however, as more are considered, the pattern will become more predictable, as is well-known. According to the present invention, three different techniques can be used for identifying a pattern according to which data can be automatically extracted from a web page or other web-accessible document. The first is structure or DOM driven, the second is contents or text driven, and the third is a combination of these criteria. Structure driven pattern generation relies upon the underlying structure of a web page or other web-accessible document to identify elements, i.e., uses their interrelation and relation to the page as a whole. Contents driven pattern generation relies upon certain key phrases that are present in each element of interest or in another element having a known relationship to an element of interest. The combination approach uses both of these approaches to identify the pattern.

Figure 5:
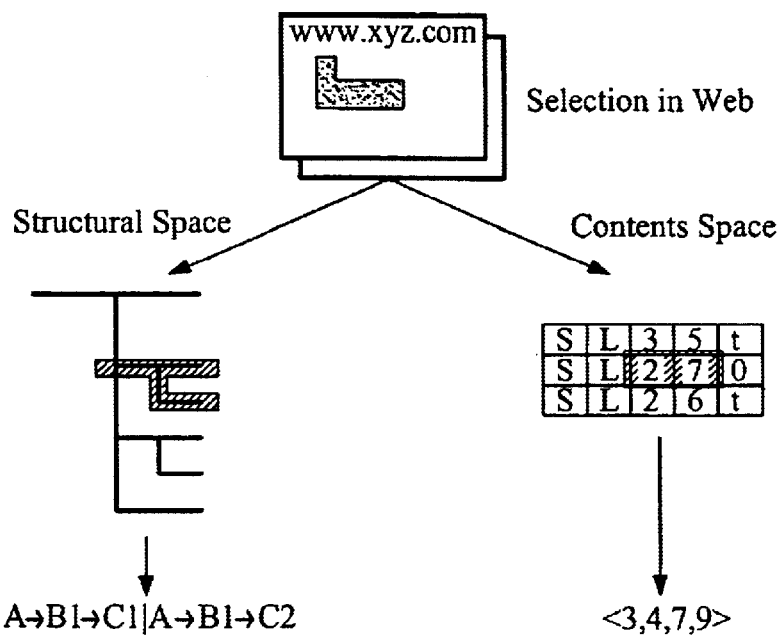
FIG. 5 illustrates the use of structural and contents spaces according to the preferred embodiment of the present invention.

Referring now to FIG. 5, a user selection (for example, all HTML elements included between a start position of the cursor and an end position, i.e., a portion highlighted) is expressed in two different spaces: first, the structural space based on the document's hierarchy; and second, the contents space based upon the document's text (individual portions of an object defined within the HTML object hierarchy). Thus, a selection in a web page or other web-accessible document is expressed in structural space as a certain cell in a certain row of a certain table, for example, and in contents space as the $n^{th}$ word in the $m^{th}$ line of the $p^{th}$ section. Access to relevant information typically uses both specifications. For example, an array cell could be a leaf in the structural space, the smallest accessible element of which can contain a block of text. To represent the selection of one word within this block, the contents space specification is needed. The module uses the definitions in these spaces of a selection and processes the selection in an array, list or other similar configuration.

Additionally, the extraction recording module 22 is capable of inference, i.e., given two selections, a pattern is extracted in a structural space by going up in the document hierarchy and retrieving the siblings using conventional AI techniques. A pattern can be extracted in the contents space by generating a regular expression that matches the selections. The pattern extraction is preferably made available to the application through the API 20.

Referring again to FIG. 4, after an HTML web page, for example, or other web-accessible document is loaded 140, the page is parsed 150 to produce 160 the HTML hierarchy. Similar to what has been described for the navigation script, the user would then make a selection from the web page or other web-accessible document by highlighting that portion 170, for example. Regarding the example presented in FIG. 4, a user has selected the starting element portion AA, part of the parent element A, and ended his selection on element portion BB of element B. That selection is then mapped 180 into the HTML hierarchy that was created 160. In other words, the user started in tag 1 of content "AAA" and ended in tag 2 of content "BBB". The system next maps 190 selected lines and words to lines and word offsets within the selected elements, thus generating the start cursor position within tag 1 and the end cursor position within tag 2. In other words, the selection by the user is mapped 190 to generate the recognition that the user selected tag 1 from line 1 starting at word 2, to tag 2, line 1 ending at word 2, for example. Finally, the extraction script is recorded 200.

The output of the extraction recording module 22 is again preferably an XML file describing the selection(s) to be given to the extraction playback module 24. It should be noted that this selection specification is expressed in an abstraction of the actual web page or other web-accessible document from which it was recorded, i.e., it can be applied to another page with similar structure. As will be evident to one having ordinary skill in the art, this is a powerful feature that allows an application program to extract information from web pages or other web-accessible documents similar to the recorded page as well as from future iterations of the recorded page.

The navigation and extraction modules 10 and 20, respectively, preferably comprise plug-ins in a browser such as Microsoft IE forming a smart client. The power of smart clients lies in their capability to "meta-surf", i.e., drive the browser to navigate to web sites and scrape relevant snippets of information from those sites. Meta-surfing takes the surfing paradigm to the next level. It empowers the surfing process to include information stored on the microprocessor-based device of the user, for example, user name and password, with no loss of privacy.

Figure 6:
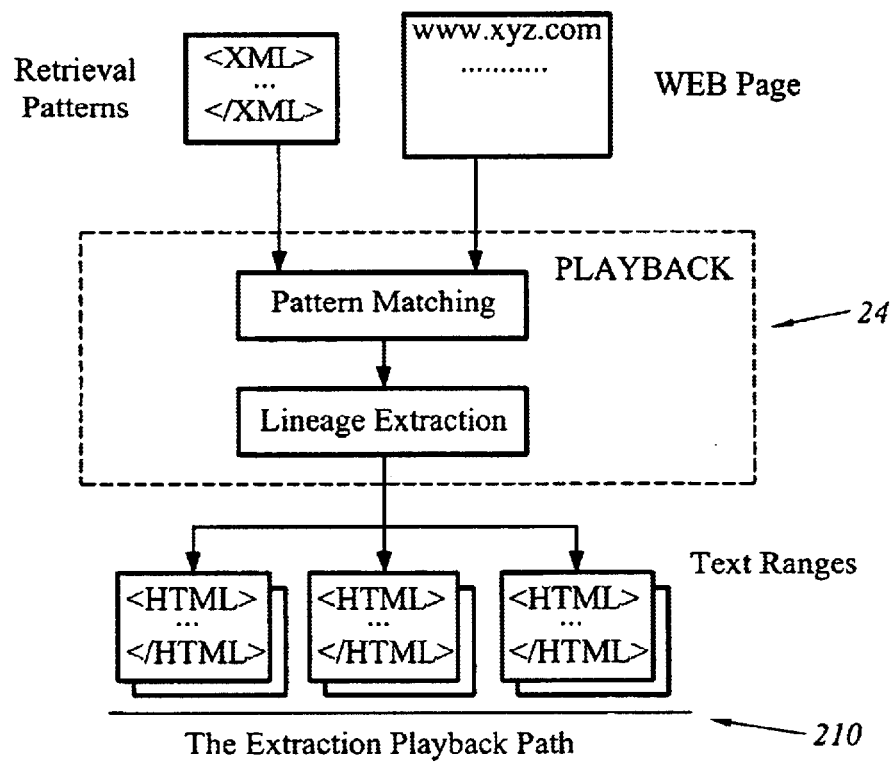
FIG. 6 illustrates an overview of an extraction playback module according to a preferred embodiment of the present invention.

Referring now to FIG. 6, the extraction playback module 24 uses the retrieval specifications from the extraction recording module 22 (using the XML file) to extract actual information from a final web page or other web-accessible document loaded in response to operation of the navigation playback module 14. The retrieval information contains both the structural and contents space specifications, and if these are expressed as patterns, a termination condition (for example, the first 5 matches or the last one). The output of the playback module 24 is a text range 210, i.e., a subset of the H° FML code of the target page that matches the retrieval, i.e., extraction specifications. In order for the extracted text range to be displayable and/or printable, the playback module 24 extracts its lineage (parent structure, grandparent or other lineage) that specifies its context. The extracted text range can represent not only pure text information, but also pictures, charts, graphics or other non-textual information. A calling application can arrange these elements in a form suitable for display to the user or for further processing. Preferably, the extracted text range embeds information from both the structural and contents spaces and preferably maintains links that permit further processing in both. As mentioned earlier, according to the present invention, techniques of pattern recognition and extraction used include: a structure or DOM based method, a contents-based method and criteria or a combination of structural and contents-based method.

Figure 7:
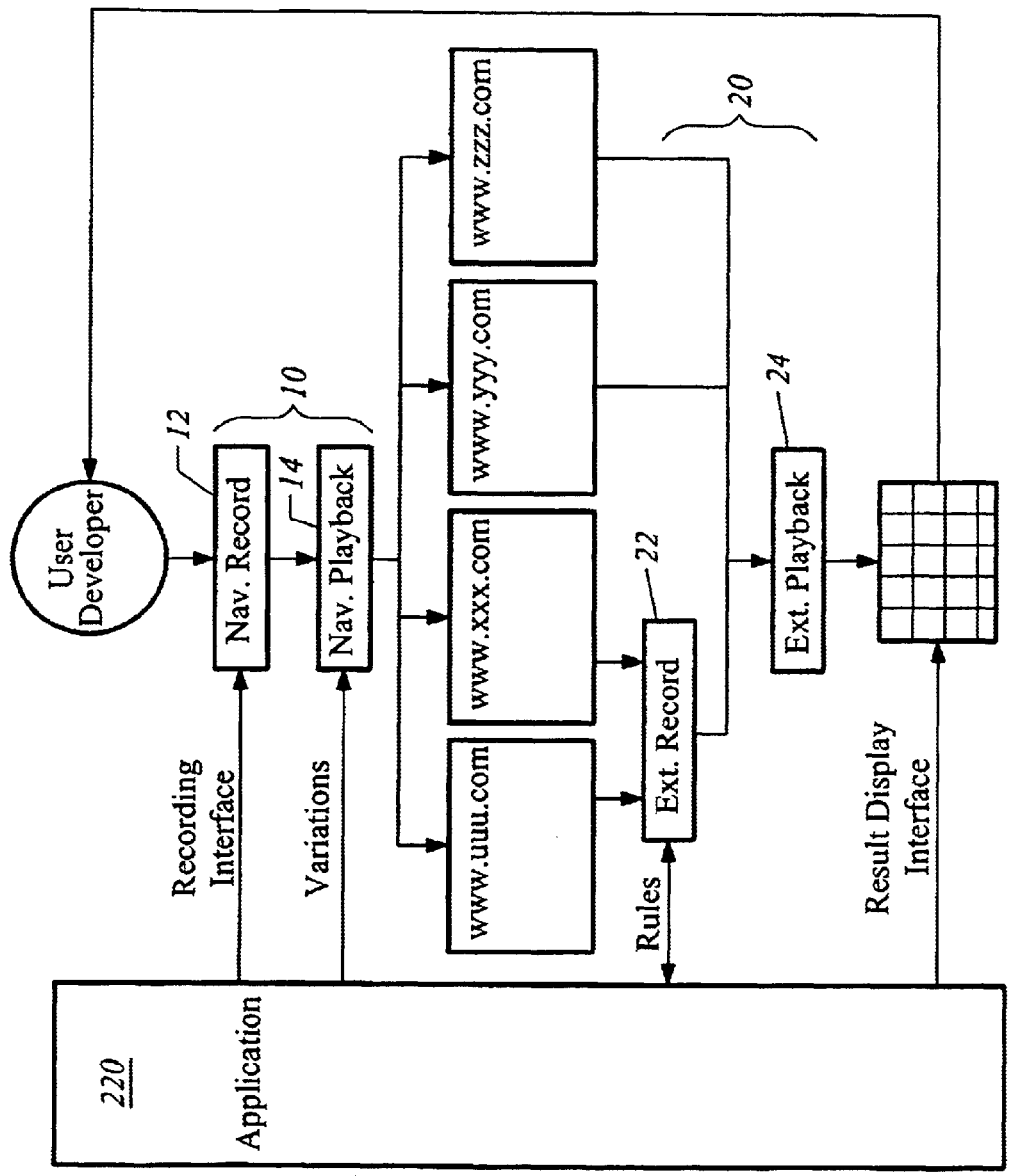
FIG. 7 illustrates an overview of a system integrating the preferred embodiment of the present invention.

Referring now to FIG. 7, the system according to the present invention is made available through the navigation 10 and extraction 20 APIs. Thus, a wide variety of applications can be built on top of the core technology provided by the system. Development of a general application 220 taking advantage of the core technology would, for example, identify a set of web pages or other web-accessible documents relevant to the chosen domain; build the navigation paths to these sites using the recording module 12; build the interface to get the user's personal information (login name, password and other user identification data), if needed; build the information retrieval rules to be used by the extraction API 20; build the interface to present the retrieved information to the user; and build the interface to refine the information retrieved using the inference capability of the recording module 22.

An example utilizing this technology is illustrated by the following. Referring now to FIG. 8, a user needs only to start recording using the navigation recording module 12 and "surf" as usual to a desired destination URL using Internet Explorer, for example. Upon reaching the destination URL, the user indicates the same to the recording module 12. The user can interact with the recording module 12 using buttons 230, for example.

Figure 10:
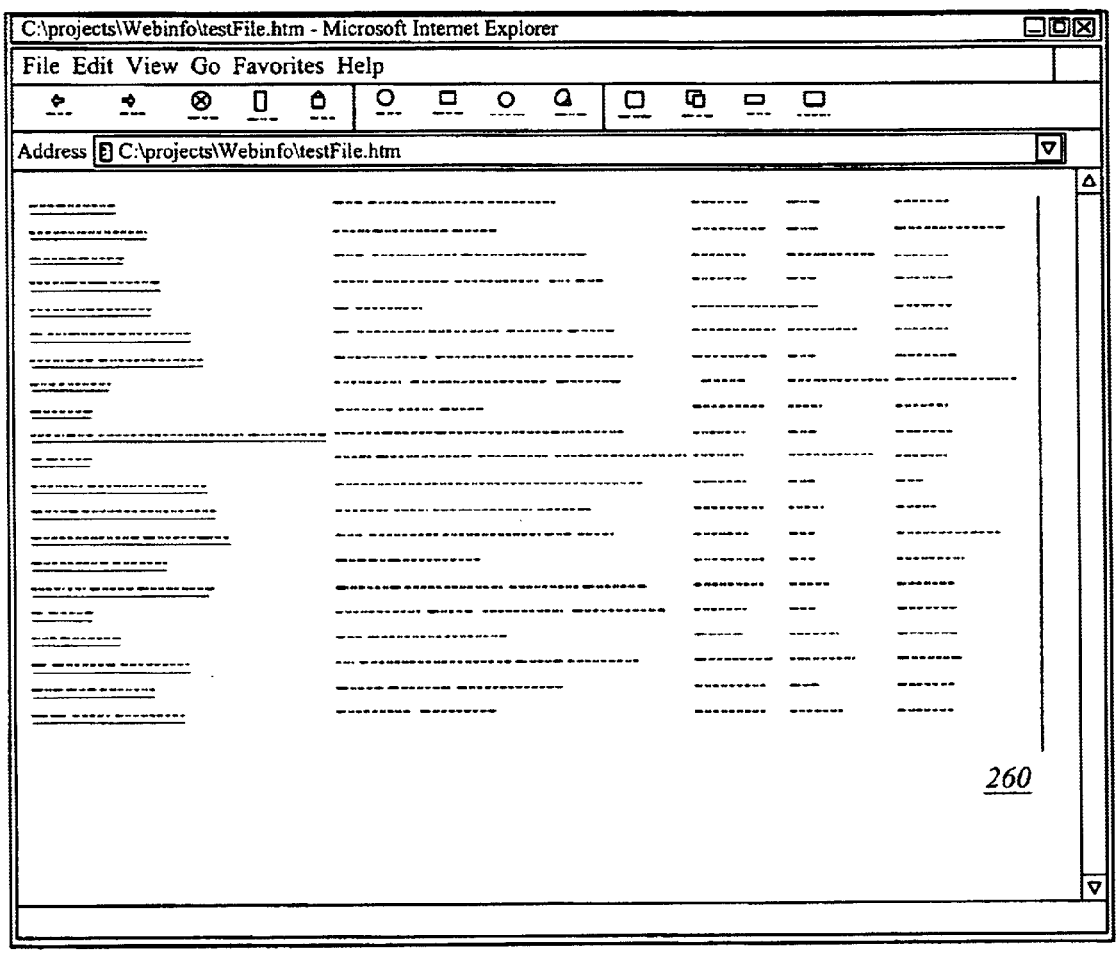
FIG. 10 illustrates text that has been automatically extracted according to the preferred embodiment of the present invention.
Figure 11:
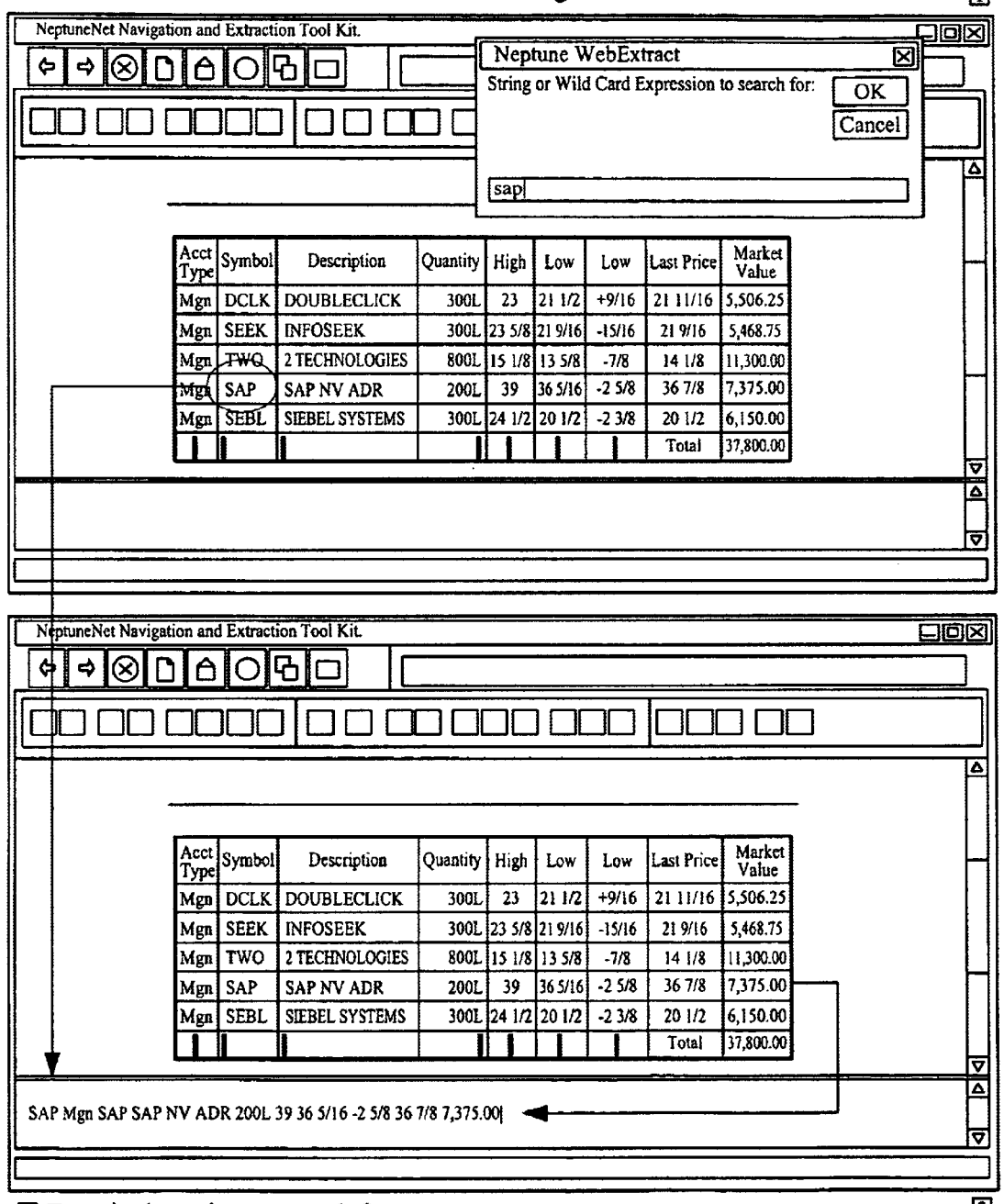
FIG. 11 illustrates the use of a find text command according to the preferred embodiment of the present invention.

Referring now also to FIG. 9, the user then highlights (i.e., using a mouse, drags over) the desired information to be extracted 240, and the highlighted data is automatically recorded and displayed in lower window 250. The user may now exercise the option of editing the extraction script to fine-tune his selection. Preferably, a second selection is highlighted by the user so a pattern can be generated using conventional AI techniques. Referring now to FIG. 10, the user upon playing the recorded navigation and extraction scripts (collectively referred to as Navex) can automatically extract numerous records 260 that match a pattern (which may or may not have been fine-tuned) derived from the extracted text by the extraction recording module 22. Referring now also to FIG. 11, a user can utilize a "find text" command 270 to find a particular string such as a stock symbol and extract data according thereto. In the case of FIG. 11, the extracted data may include account type, symbol, description, quantity, high, low, change, last price and market value, for example. This represents the use of contents driven patterns, the steps of which are recorded by the extraction recording module 22.

Structure-based recognition and extraction relies on the fact that a web page or other web-accessible document is a collection of HTML tag elements, for example, that are typically arranged in a repetitive manner. If the HTML pattern is converted to a "road map" where certain elements are defined with respect to the top of the page, a clear structure emerges. According to one preferred embodiment, the user is required to define two instances of his perceived pattern. The two selections are then compared to determine what structural commonality exists. For example, a table can include cells, each cell having a well-defined structural relationship to the parent container, the table. Alternatively, the user could choose the object or element by highlighting portions thereof, the selection of which is preferably mapped to the appropriate displayed element. A user could then define the desired pattern dependent upon the selected mapped element by defining which portions are to be varied, and how to vary them.

Contents-based recognition and extraction relies upon locating key words in a web page or other web-accessible document and then selecting tags that contain that key word. A regular expression search is preferably used to define complex text pattern searches. For example, in the table, all rows containing "300L" or "200L" can be extracted using a regular expression: "[23]00L". In other words, the selection is based on the contents of the tags, not their relationships to the table.

Criteria-based recognition and extraction relies upon the structure and contents-based matches that operate in two distinct domains. Criteria matches bridge the gap. In addition to both structure and contents consideration, criteria matches can also include presentation attributes such as color, X and Y location, font size or other attribute. The pattern selection process is a logical AND of all specified criteria. In other words, criteria extraction techniques can be used to recover all cells in column 3 (structure-based) that require that the cell in column 7 have a red font (attribute) and contains a minus sign (contents-based).

Referring again to structure-based recognition and extraction and also to FIG. 12, therein is illustrated another example. A user has selected text 1110 within a conventional web page 1120. The parental hierarchy of this highlighted element within the page 1120 can be seen as DL-DT-A (1130-1140-1150). According to the present invention, the system infers that the user wishes to further extract information 1160 using this parental hierarchy information (DL-DT-A, 1130-1140-1150).

Figure 13:
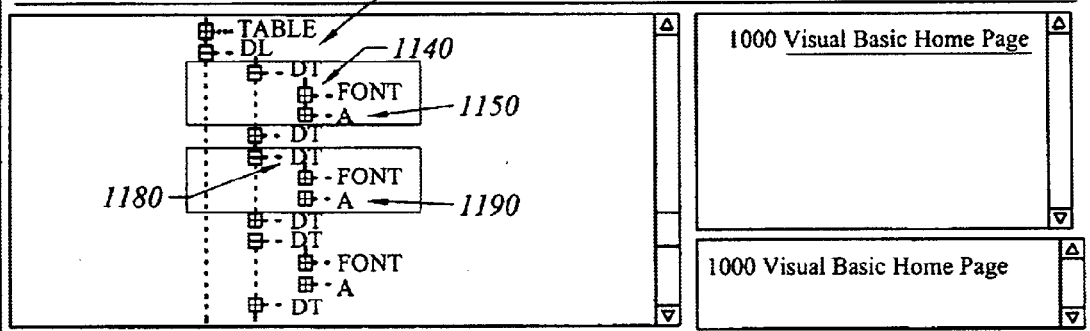
FIG. 13 illustrates the use of a web page hierarchy, for example, to determine an extraction pattern according to the preferred embodiment of the present invention.

Referring now also to FIG. 13, therein is again illustrated highlighted element 1110 and related parental hierarchy information 1130-1140-1150. Further illustrated are element 1160 and related parental information 1170-1180-1190. Using AI techniques, the system of the present invention evaluates parental information 1130-1140-1150 and 1170-1180-1190 to determine a most likely pattern that the highlighted element 1150 and element 1160 can be classified as satisfying, and then finds the next element which matches that pattern, if any.

Again, it should be understood that a web page or other web-accessible document is a collection of HTML tags, for example. Some common tags are: TABLE—a table of data internally consisting of: TR—a Table Row, which in turn contains TD—a "cell" of data, A—Anchors and P—Paragraphs, for example. Formatting tags are also typically included such as: B—Bold, I—Italic, U—Underline and BR—Break (new line). When two selections are made, the HTML pattern extractor determines what the two selections have in common; i.e., at the least, two patterns are the same tag, and the "lineage" or ancestry tree matches, that is, both selections have ancestry that matches DL-DT-FONT-A. If the pattern type and lineage match, then a pattern is determined to exist. It should be understood that a lineage may be "clouded" by formatting elements such as B, I or U. The pattern extractor preferably removes these from consideration. i.e., ignores them, when performing the match.

Taking a moment to review parental information 1170-1180-1190 related to element 1160, and parental information 1130-1140-1150, pattern DL-DT-A is clearly recognizable and identifiable using conventional AI techniques. (Note that in this case 1170 and 1130 refer to the same DL.) Further, series element 1200 associated with the object hierarchy of element 1140 increments according to the record number when compared to element 1210 related to parental hierarchy element 1180 (i.e., "1" to "3"). Accordingly, software implementing the system of the present invention preferably uses conventional pattern matching techniques well-known to those having ordinary skill in the art to infer the next record that the user wishes to extract should have a parental hierarchy that fits the pattern DL-DT-A and includes a value of 5, then 7, 9 . . . associated with the DT parental hierarchy element. Having been taught the pattern (DL-DT-A1.3.) through the user's interaction or from an application calling the present method, the navigation and extraction APIs 10, 20 can be used to extract numerous records matching the pattern defined.

The purpose of "find text" and, hence, contents-based pattern recognition is to provide answers by utilizing text based searches. For example, the regular expression [0–9]*[0–9]*[0–9]+\/[16\32]* will return any number of any length followed by any number of any length followed by any number of any length and/or a number divided by 16 or 32. As will be understood by those persons having ordinary skill in the art, this expression may be useful in extracting stock quotes from a web page or other web-accessible document. The final text command is simply recorded as a step in the extraction XML file. Information extracted can further be mapped according to known relationships, after which application specific components can be built to permit the use of standard query tools, for example.

As described earlier, contents-based pattern matching uses a selection process by conducting a regular expression search on a web page or other web-accessible document for a pattern, for example, [23]00L. Elements that contain the pattern are tagged. Tagging is a process of marking an HTML element in the HTML DOM (structure map), for example, as passing the key word search filter and being of interest to the user. Next, for each tagged element, the user may select an element before or after the selection by traversing the tree. He may do this in two ways: moving up to the parent element (Up Parents) and shifting the source Index ± (Shift offset) or defining the road map that specifies a set of directions to go from the tagged element to another related element. For example, a compound road map is <UP>TR:TD,TD,TD, i.e., move up to the first TR then go to the $3^{rd}$ cell in that row.

Criteria-based matches identify selections based on a series of tests. DOM or structure-based matches require well-structured web pages or other web-accessible documents or the ability to analyze the page and set stop and ignore tags accordingly, for example, start at the third row in the second table and ignore formatting tags, while contents-based matches are less stringent. If the key word search succeeds, data is returned if the key word exists in all items of interest and the user is interested only in the key word and not its location in the DOM. Criteria-based matches are a combination of both types of matches. In a typical situation, the criteria for selecting an item will be based on: (1) its structure attributes (tag name, lineage or other structural attribute), (2) its presentation (font type, location on the page, height, width or other formatting) and (3) contents in both the HTML text and the text shown to the user ("Innertext"). All tags in the web page or other web-accessible document are preferably examined to determine whether they meet the selected criteria.

For example, referring now to FIG. 14, regular expressions may be entered for lineage or the text contents (items 2,3,4,5,6). Additionally, ranges for the geometry may be entered in items 7,8,9,10: the Left, Height, Top and Width of the tag element. The tag elements that qualify are those that meet all the criteria specified. More particularly, according to a preferred embodiment of the present invention, the following selection criteria are utilized: (1) tag name—select all tags based on a list of tag names, typically one item; (2) lineage—computed by going up the DOM tree until the BODY (top of the document) is reached (the expression entered must match a portion of the computed lineage or entirely); (3),(4) text—search for text in either HTML or the Innertext; (5),(6) tag inclusions—lineage may not be specified, but instead an include/exclude list may be specified; (7),(8),(9),(10) geometry—Top, Left, Width, Height. Items 1,2,3,4,5,6 are computed by the system based on the DOM tree and Innertext and InnerHTML attributes of the element (available from the DOM tree). Items 7,8,9,10 are attributes of the element, available in the DOM tree.

From a general standpoint, these individual pieces can be used in a total system solution as well. For example, navigation and extraction scripts (collectively Navex scripts) can be read and executed. If one fails, other scripts can be called to eventually result in a fail condition or the extraction of relevant data from a web page or other web-accessible document. Two tables can be generated from the extracted information, namely, the HTML descriptor and the actual text. It should be understood that the HTML descriptor for the extracted text is important because it may be necessary to fully understand what has been extracted, for example, green for stock prices that have risen or are positive, and red for those that have fallen or are negative. An application can then cross-reference and use this information to permit a user to have access to the information in a database format.

The power of the pattern matching system according to the present invention lies in teaching patterns of any of the three types, and the system automatically generating the same required snippet object structure for all cases. In order for this approach to be successful, the teaching process is a simple and intuitive, preferably point-and-click, interface to specify extraction scripts. Either the extraction procedure validates the data immediately, or a re-teach of the extraction procedure is automatically requested.

Figure 15:
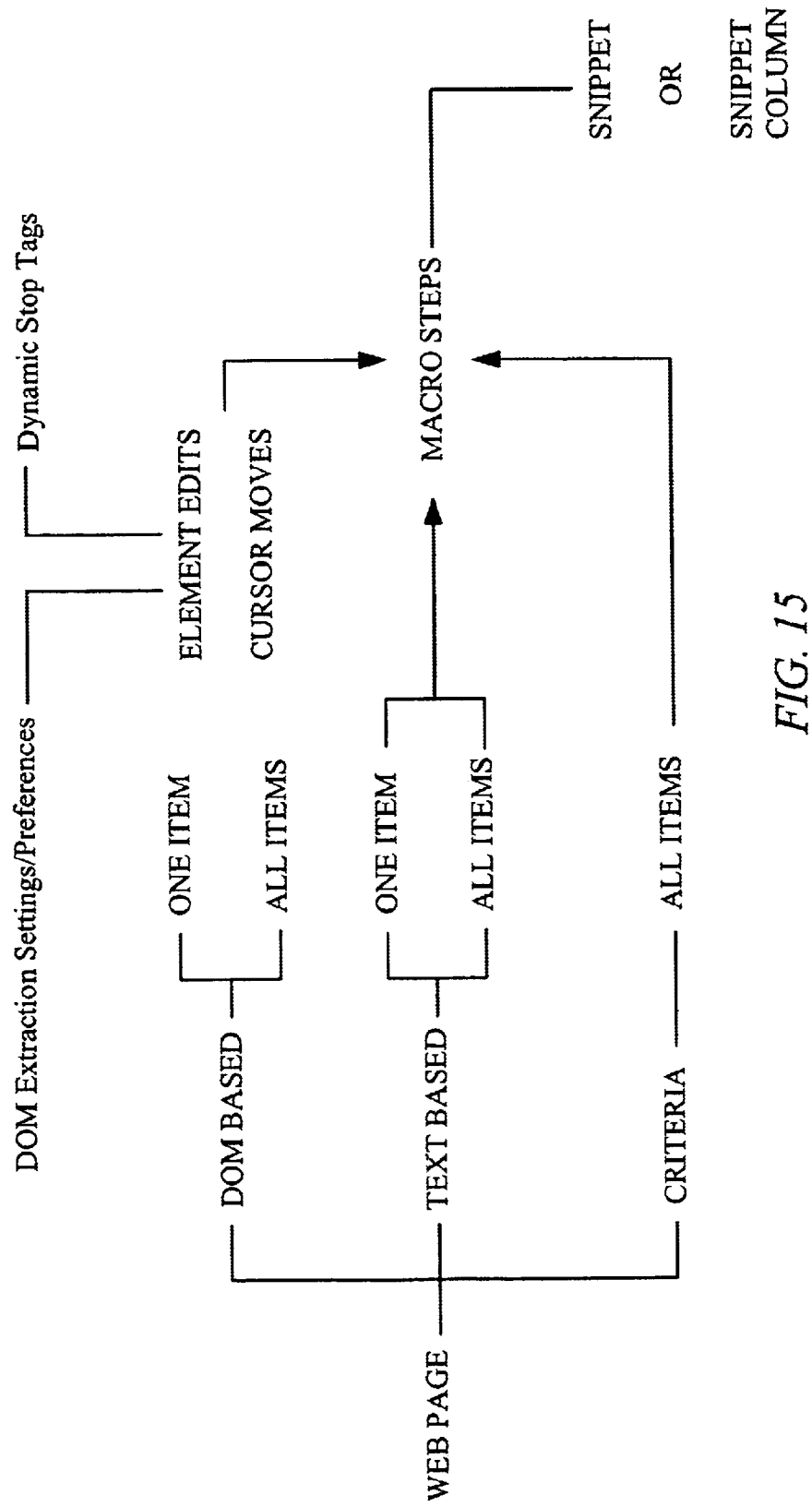
FIG. 15 illustrates how macro steps can be used to incorporate three types of pattern matching and extraction according to a preferred embodiment of the present invention.

Referring now to FIG. 15, all three pattern matching approaches "meet" at macro steps. That is, the rest of the system receives a pattern of type snippets, on which subsequent operations are performed. Having recorded navigation and extraction schema in XML files, for example, scripts can be written to employ them. A representative script could, for example, automatically navigate to a web page or other web-accessible document, extract the information on the final page, process the data, including validations, and return results as an HTML table in the browser by executing a series of operations according to a navigation file, then an extraction file, then performing operations on the extracted data. The constituents of the script include one or more navigation and extraction schemas and one main program that calls these schemas in the order required. There may also be other programs called by the main program to perform specific processing. Not only data but also scripts or programs can be identified and streamed in accordance with the principles of the present invention, i.e., the system of the present invention has application for ASPs. A script helper is preferably provided to: define the schema files the user wants to reference in his program (akin to an include statement in C); write the glue to call these programs in a main program module; include references to objects such as databases or files, for example, that the user wants to access; present the output data to an IE browser, for example; or send an e-mail notification.

The input to the script helper is preferably an XML file that defines the constituents of the complete program. Each XML step is a file to be included in the final program. Based on file extensions, the system preferably will automatically convert the file input to VBScript code. Each conversion results in a subroutine (or function) being added to the main program. The main program can now call the subroutines to perform automated navigations and extractions.

Default execution command lines are stored in the XML make file, while file extension type informs the system what type of file is being loaded and defines subsequent processing. The system according to one preferred embodiment of the present invention preferably has objects loaded that include an extraction run time processor that knows how to run a taught schema, gives access to internal objects such as the CEFIND, CECRITERIA and documentation on how to use their functions in the Object Browser of VB; a grid processor that processes the extraction data into formats requested and provides low-level presentation capability;

and an object schema that takes the snippet grid information and provides XML/Excel/database access. These objects are preferably accessible from within scripts loaded to the extraction playback module 24.

Of course, if the information already exists in XML, conversion to XML is not required. In accordance with the foregoing description, XMLized snippets can be extracted from HTML. On the other hand, information may appear in a format other than XML or HTML. In accordance with the present invention, data extraction may involve the intermediate step of first converting non-HTML to HTML. Commercially available applications such as Microsoft Word include utilities to save documents in HTML, and the system of the present invention can utilize such utilities as plug-ins in the browser to convert to HTML prior to producing XML snippets. In various situations, however, such utilities do not exist or they operate imprecisely. For example, in the situation in which the format is .pdf, the system of the present invention supports the intermediate transformation from .pdf to HTML, that provides imprecise conversion, as well as data extraction from .pdf to XML snippets using a .pdf recorder plug-in to provide precise conversion of all .pdf documents. More specifically, intermediate conversion from .pdf to HTML is imprecise when .pdf tables and lists are encountered. The following describes the aspects of the .pdf recorder in accordance with an embodiment of the present invention to precisely convert a .pdf document.

The .pdf recorder mines textual data from .pdf documents employing specified filters, and the data is preferably formatted in required format and saved in HTML, CSV files. The .pdf extraction involves two steps, namely filtering and structuring.

Figure 16:
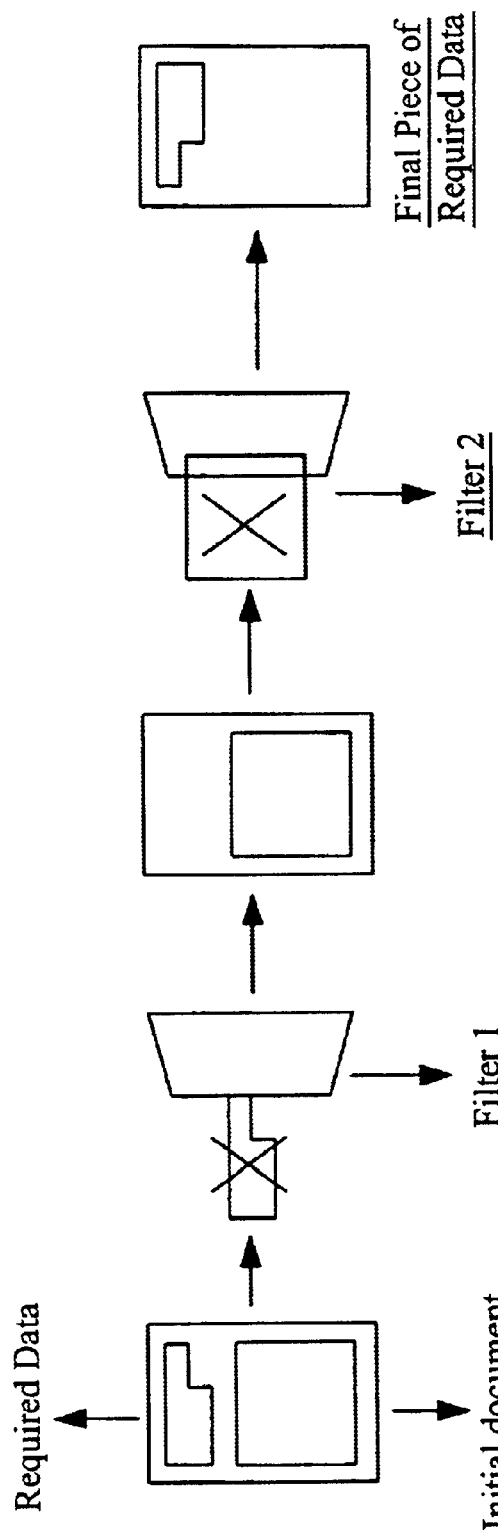
FIG. 16 illustrates an overview of filters for data.
Figure 17:
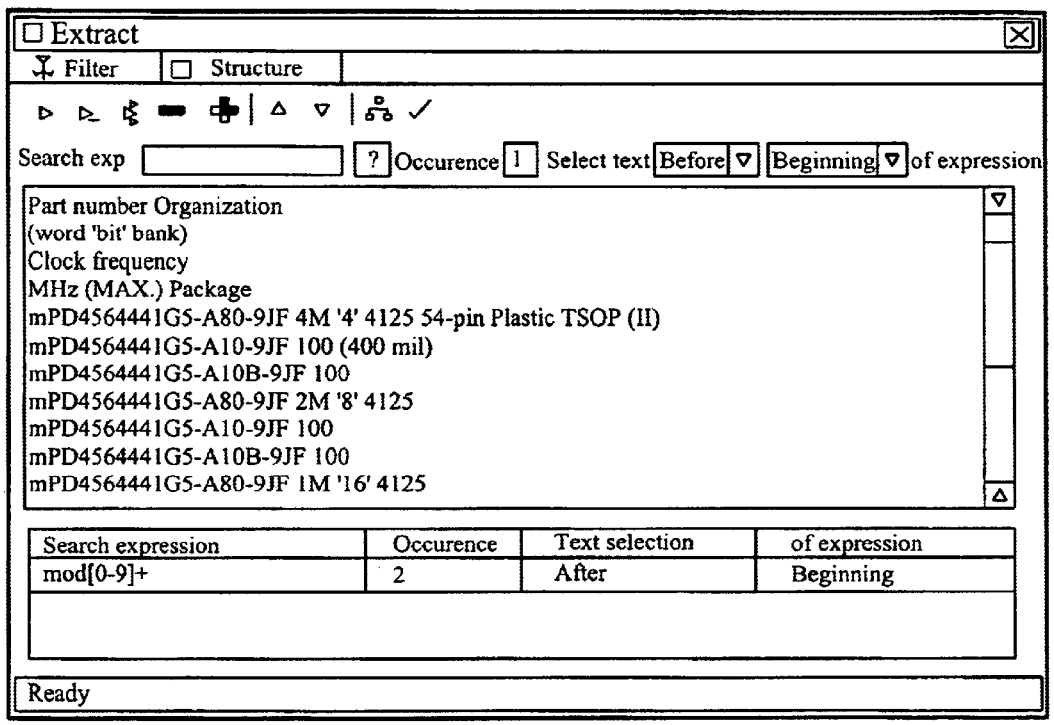
FIG. 17 illustrates a region of interest of select data.

Filtering removes unwanted data. FIG. 16 illustrates the filtering mechanism. The input is the data grabbed from the specified page of the .pdf document. Filter "1" removes the first part of the unwanted data and forwards the remainder. In order to do this, the following procedure is performed. First, the user specifies an expression (word, phrase or a regular expression) which forms the boundary between the wanted and the unwanted data. Second, the user specifies whether the data needed is after/before the expression specified in the first step. Third, the user specifies whether or not to include the previously specified expression (before/end). The data forwarded by filter "1" forms the input to filter "2". The user repeats the steps described above to be left with the data region of interest. Referring now to FIG. 17, the highlighted section indicated by the bolded text, for example, is the selected data within the region of interest on application of the regular expression filter mpd[0–9]+.

Figure 18:
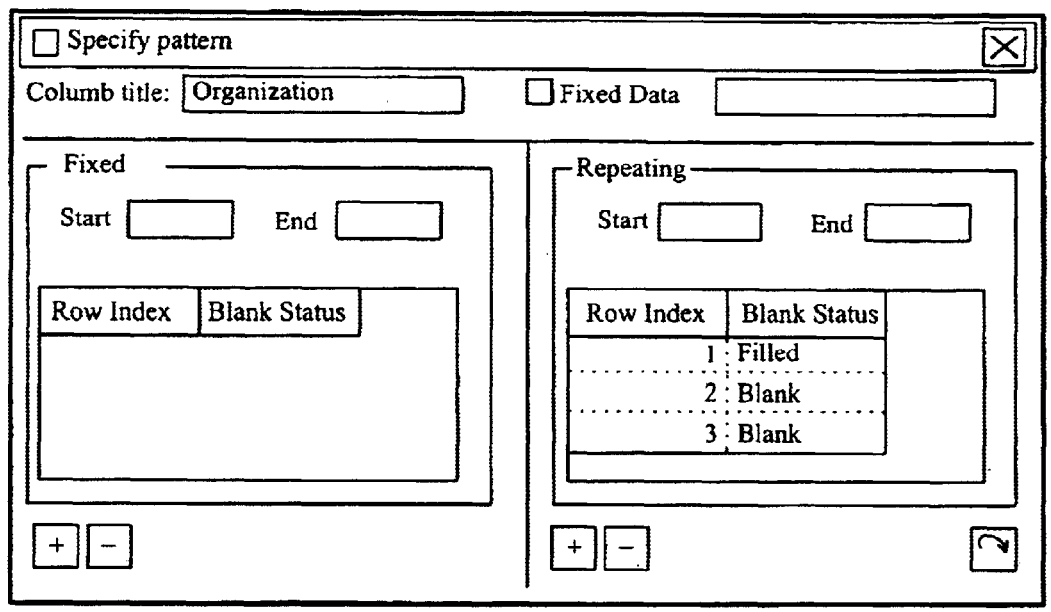
FIG. 18 illustrates a screen for specifying a repetitive pattern in each column defining a tabular structure.

Additionally, structuring of the data is also performed. In order to convert the data into a tabular form, the user defines the table structure and the pattern of each column. For example, FIG. 18 illustrates the pattern for the second column of the table. After the user defines the pattern for all columns, the table emerges, as shown in FIG. 19.

Figure 20:
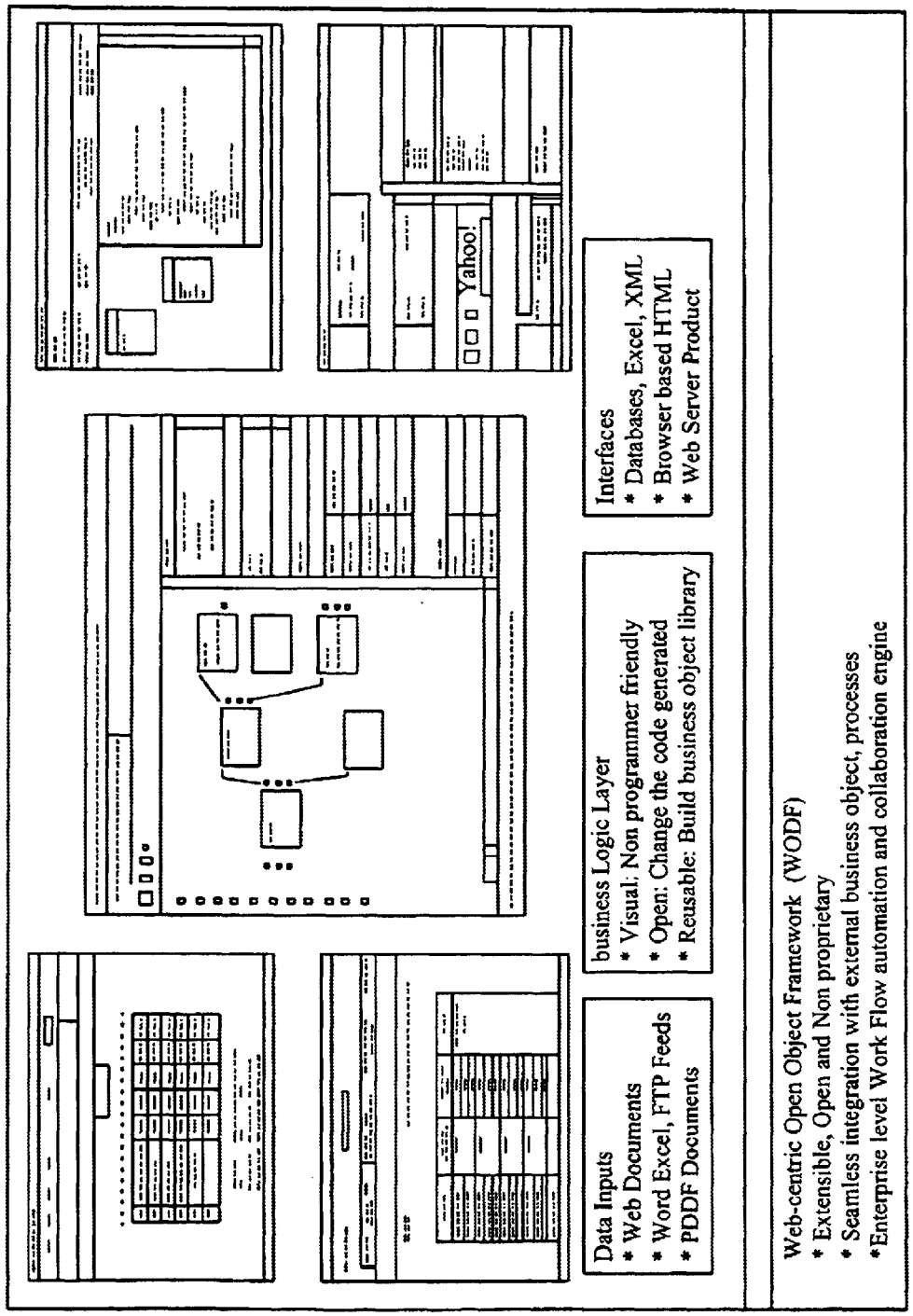
FIG. 20 illustrates a Web Studio development environment for extracting and processing the extracted data.

The description to this point refers to various embodiments developed to aid in data extraction from document sources, typically (though not exclusively) accessed on the Internet through a browser. The purpose of these data extractors is to convert any document-centric information to accessible intelligence. To provide that access to existing enterprise processes, additional tools must be provided to normalize and cleanse the data extracted so that the final output is in the form required by the business process consuming the data. A visual programming development environment, the "Web Studio", enables non-programmers to build agents to extract and deliver snippets of relevant information in the format most useful to them. Referring now to FIG. 20, the Web Studio helps define the flow of navigation, extraction and normalizing processes that define the complete data collection procedure. The Web Studio records the processes through graphical workflow drawn by the user. The Web Studio then generates a script that is interpreted at run time through a Web Player, a playback system for the script.

Two preferred deployment vehicles for run time execution are provided, namely, smart servers and smart clients, also known as Web Bands. Both are described in turn in the following sections.

Figure 21:
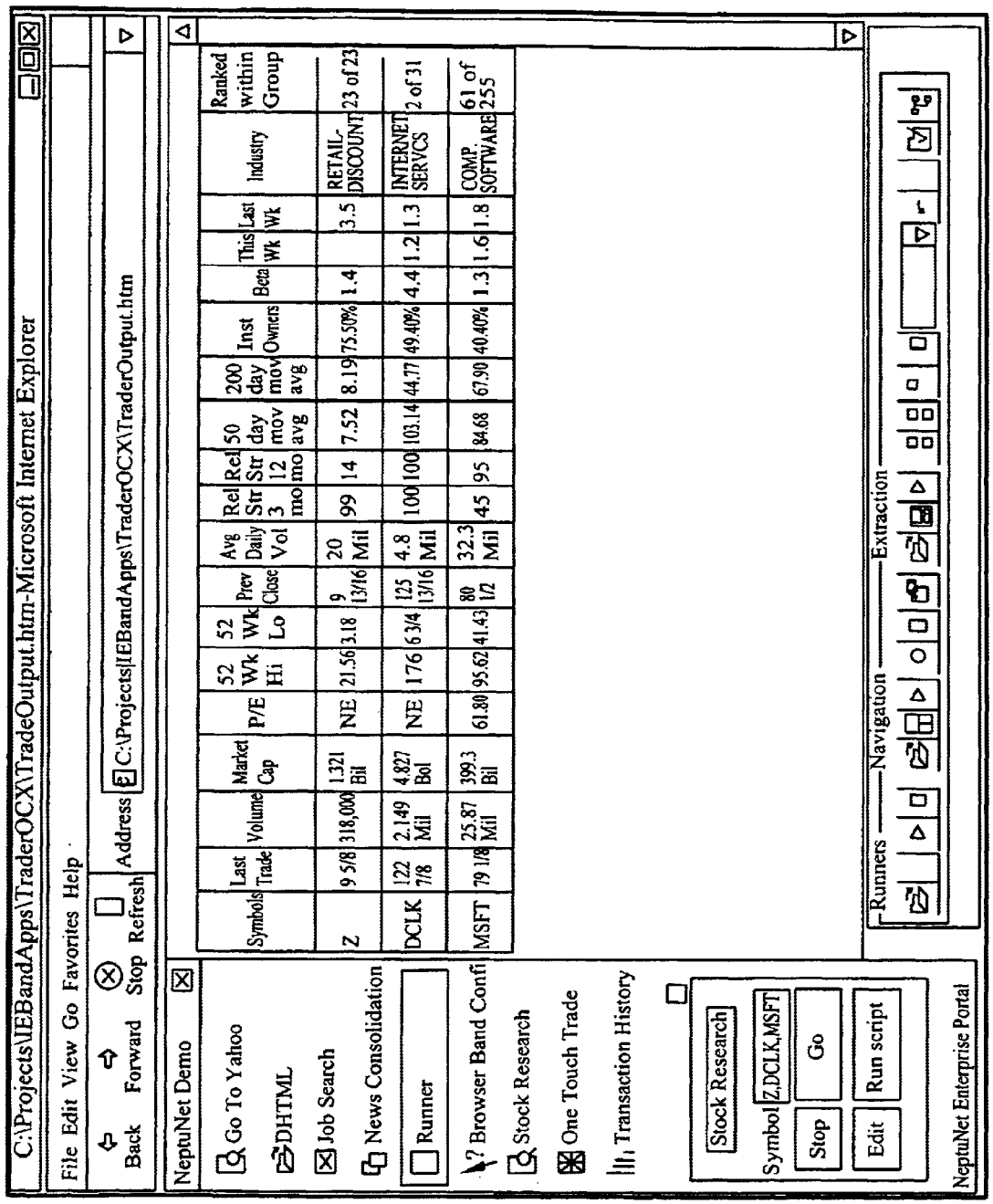
FIG. 21 illustrates a Web Band incorporated into commercially available web browsing software according to the preferred embodiment of the present invention.

Referring now to FIG. 21, Web Bands is a software system that is preferably installed on the microprocessor-based device of the user and exposed as standard (Vertical and Horizontal) bands housed within the browser, for example, Internet Explorer. The Vertical Band, which is the main user interface, contains items (like buttons or hyperlinks) that allow the user to perform specific tasks using the underlying technology according to the present invention (for automated navigation, extraction, display, storage and other processing). The Horizontal Band provides an additional interface area for specific applications that would be invoked from the Vertical Band. The Web Bands house HTML pages that act as the user interface for the system.

To install the system, a user would go to a web site and download an installer file to his microprocessor-based device, for example, personal computer. The user would then execute this downloaded installation file by double clicking the icon or executing the Run Download Folder\install.exe command at the command prompt, for example. This would start the process of installing the Web Band system on the user's microprocessor-based device. The installable is preferably an Active Setup, which means that the installer downloads the various files that are installed on the user's machine from the web site. This ensures that the latest version of the software is always installed on the user's machine. It should be understood that the user's microprocessor-based device must be connected to the Internet or another network through which it can access required data from the web site. Also, the entire installation may be distributed on removable media such as CD-ROMs. The installation creates the folders needed by the Web Band system, installs required files in these folders, registers the various COM components on the target microprocessor-based device and modifies the system registry to register the Web Bands as IE bands.

Once the software is installed, the user can view the Web Bands by starting IE and selecting a View—Explorer Bar—Vertical Band menu option, for example. The entire installable may be created using commercially available software such as Wise Installer, for example. The system includes the following major components: Web Bands, the component that a user interacts with in IE, that implements the specified COM interfaces required to be IE bands; associated file(s): NNEBand.DLL, IEBand.OCX and IEBand.INI; a Web Player, a component embedded in the Web Band to provide the main underlying functionality to download and execute scripts that constitute a task. (The Web Player itself contains many functional objects like the Web Navigator and Web Extractor that can be used by scripts.); and Band Aid, a component embedded in a web page or other web-accessible document (using the OBJECT tag in HTML) to connect to the Web Player so that VBScript and JavaScript within the HTML page can make use of the Web Player functionality.

For example, a Band Page uses the Band Aid object to get a handle to the Web Player in the current IE instance. VBScript or JavaScript within the Band Page then uses the Web Player to execute a script that performs a certain task.

The Web Bands preferably have corresponding web pages (HTML files) that constitute the user interface. These files are specified in the INI file for the Web Bands. In the default installation, they are specified as web pages on the web site. A corporation or users can author their own web pages and customize the look and feel of the Web Bands to present a rich user interface. These web pages can be created in a standard HTML Editor and can contain DHTML, VBScript/JavaScript, applets or plug-ins, for example.

Some guidelines need to be followed to use the underlying Web Player system. The user can modify the INI file entries to specify the required Band Pages as the default. The Band Pages preferably consist of HTML elements (like hyperlinks or buttons) that the user selects/clicks on to carry out specific tasks. All the tasks correspond to scripts that are executed in the Web Bands at run time. Thus, each element (that constitutes a task) in the Web Band has some VBScript or JavaScript code that is executed in order to run the corresponding application script. The Web Player that can comprise the extraction playback module 24 (that is a part of the Web Bands) provides the functionality to download scripts and execute them on the user's microprocessor-based device. This functionality can be invoked by standard VBScript or JavaScript in the Band Page. Thus, in accordance with the present invention, an infrastructure is provided for streaming programs across the Internet. A user can log on to a web site, a script is provided in the Web Band, and the Web Player runs the script. When the script runs, the results can be displayed to the user, for example. This can enable the user to access downloadable transportable business intelligence, so the host of the web site can send or license a business object for execution by the user. Alternatively, the business object can be ported to the web site for execution and the results displayed to the user.

Additionally, integration with applications such as Microsoft Excel is now possible. Data such as stock quote updates, for example, can feed directly into an Excel sheet. That is, the navigation and extraction modules 10,20 can be run directly from an application such as Microsoft Excel to fill an Excel sheet, i.e., can be embedded in the application and invoked within the application to pull in relevant data and process that data. Additionally, embedding the navigation and extraction modules 10,20 within an application that is in turn embedded within a browser enables "one-click" operation to pull in any web-accessible document in any format to any application executed anywhere on any platform.

The system of the present invention also enables the provider of the system to promote a developer community that would write application scripts for the Web Bands. The scripts would be made available on a web site through collaboration with the developers. Once a developer registers with the provider, script generation tools such as the navigation recording module 12 would be available to a developer for downloading. The provider would provide developers with working space on the web site to upload the scripts. These scripts might be checked by the provider for potential errors or security hazards and then made available to a user (with the Web Band system). To write a script for the Web Band system, one does not need to be an expert programmer. The developer should have a fair knowledge about VBScript, HTML and read about the structure and functionality of the Web Player. A user would be able to customize his Web Bands in order to include new scripts made available on the web site. The provider would preferably provide a simple mechanism on the web site, to allow a user to customize the appearance and functionality of his Web Bands. After the user saves the customized Web Band, the customized band would be displayed whenever the user views the Web Bands.

Figure 22:
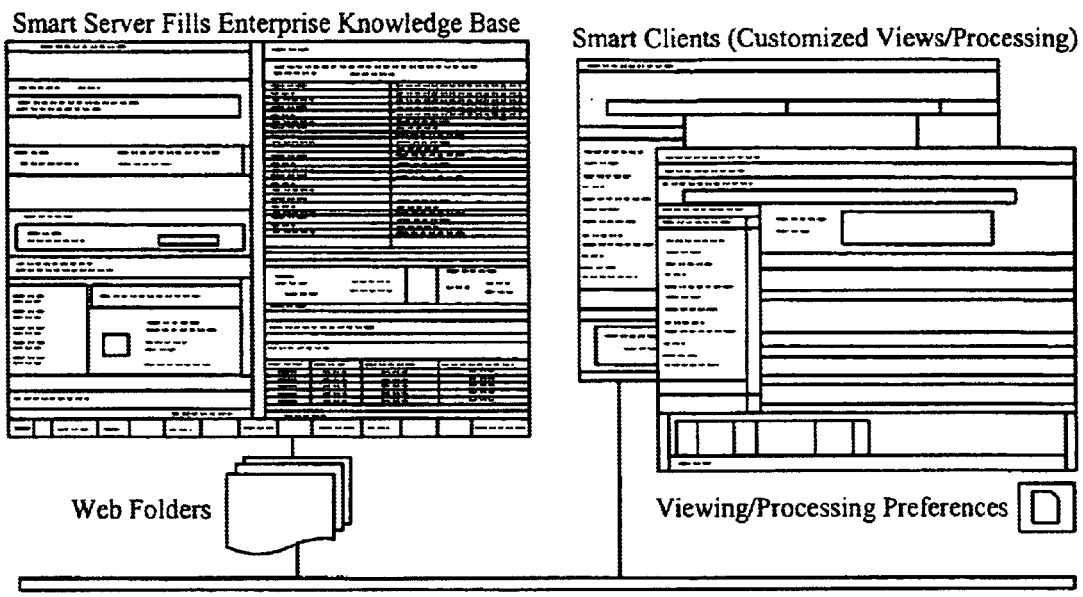
FIG. 22 illustrates an architecture for a smart web server to scour data from the Internet for deposit in a data repository.

Also, referring to FIG. 22, a smart server can be provided according to the principles of the present invention that meta-surfs to gather data on the Internet. One of the roles of a smart server is to fill a knowledge repository in background mode. As shown in FIG. 22, for example, a smart server collects data required by stock analysts such as recent news on more than 1,000 companies. Smart servers provide distributed, multiple dynamic virtual data feeds. The data feeds Web Folders that comprise a knowledge repository accessible by smart clients. In an alternative embodiment of the present invention, extracted data can be stored in a conventional repository, including Microsoft Exchange 2000 or any other database that constitutes a knowledge repository for XML tagged data, so that the user can readily access the stored data needed in conjunction with other business processes. Each request by the smart server preferably "loops" after a preset delay to visit the target web site and extract updated information.

Figure 23:
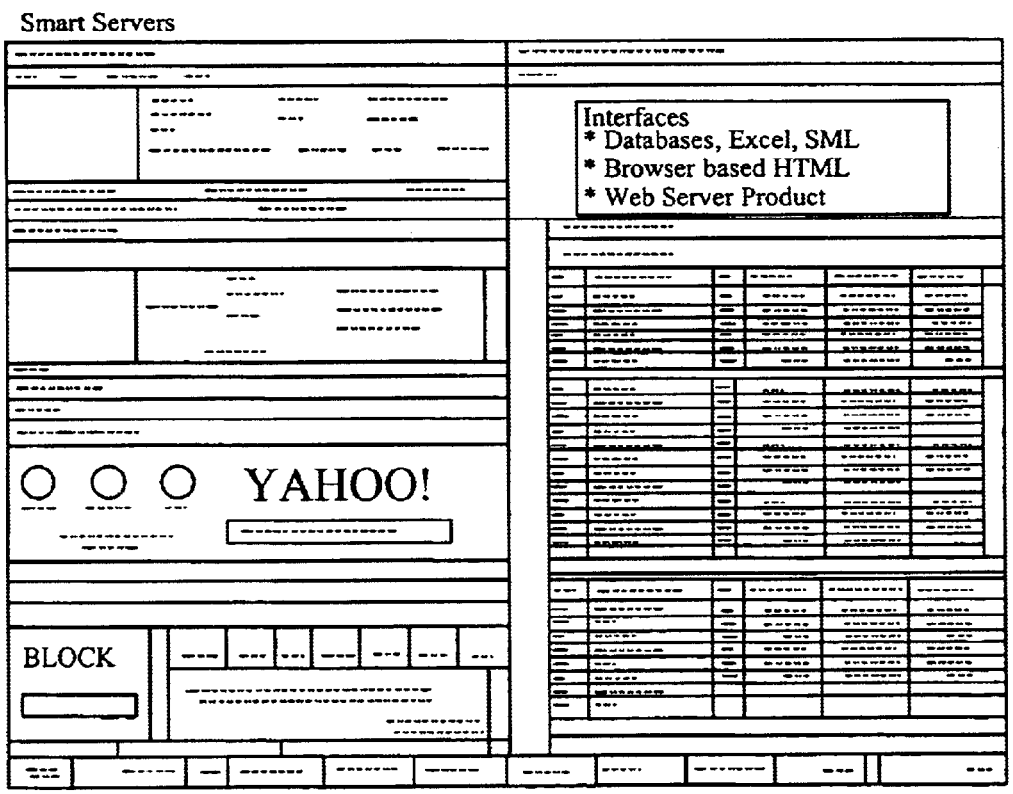
FIG. 23 illustrates a "Webwatcher" user interface to enable a user to view percolation of data extracted from various web pages or other web-accessible documents by the smart server shown in FIG. 22.

As shown in FIG. 23, a web server interface can be provided that, on demand, directs meta-surfing by a smart server to gather data through the Internet. The data that is gathered can be viewed by the user in a "Webwatcher" mode that provides a run time interface, which enables the user to monitor the data. The user can view changes in the data as the data is updated.

In a preferred embodiment of the present invention, scripts are stored at a centralized repository that is accessible through the Internet, for example. In this way, if there are multiple users of a script, should that script fail it is easy to ensure each of the users has a corrected script as soon as possible, i.e., as soon as it is downloaded to the central repository. One can activate a script by requesting access to it, temporarily storing it and then locally running that script.

It should further be understood no matter how robust the navigation and extraction methods utilized according to the present invention are, they may sometimes fail, either because changes of too great a magnitude have been made to the destination or intervening web pages or other web-accessible documents, or previously accessed web pages or other web-accessible documents are no longer accessible, for example. Accordingly, it is desirable to have some way to audit or confirm that navigation and extraction scripts are still operational. If the scripts are stored in a central repository, as previously described, auditing their correct operation becomes considerably easier.

Generally, by periodically accessing each script and at least partially executing it, one may determine whether it is functioning properly by comparing the extracted data against an expected result. For example, if a stock price is intended to be extracted, it is expected that the data extracted from the destination web page or other web-accessible document should be a number and probably a number ending in some decimal fraction. If the data extracted does not fulfill this expectation, for example, instead includes alphabetic data, then it is known the script has failed. The script can then be automatically disabled, and proper notifications sent to individuals or entities responsible for the operation of the failing script by e-mail or pager notification, for example.

Alternatively, a failing script could be re-accessed one or more times, or at predetermined intervals, to determine whether it is operating correctly and whether the error that apparently caused the script to fail has seemingly ceased to cause a problem. In such instances, the script could be conditionally re-activated depending upon design criteria. Such design criteria may include conditional limitations such as whether a technician has had an opportunity to review it and whether it has failed before. In the preferred embodiment of the present invention, such an auditing of scripts can occur many times a minute for some portions of the scripts (such as accessing a price of an item for sale from a plurality of vendor web sites), while only executing other portions of scripts considerably less frequently (actually buying some of those items for purposes of auditing the remaining portions of the script).

Although the present invention has been described with a particular degree of specificity with reference to various preferred embodiments, it should be understood that numerous changes both in the form and steps disclosed could be taken without departing from the spirit of the invention. For example, in the case of a non-HTML format, if the intermediate step of converting to HTML is imprecise, as in the case of .pdf format, in accordance with the principles of the present invention, a person having ordinary skill in the art can configure a specialized extraction recording module 22 to directly convert to XML. Thus, source information in any format can be used as a data feed. Also, additional intelligence can be incorporated into the extraction module 20, for example, the language in which data appears such as English, French, German or other language can be recognized so that relevant data in any language can be extracted. Also, the graphical user interface displayed to the user can provide a bar that enables the user to choose to view the percolation of results displayed by the Webwatcher (e.g., "Show Me", the selection of which may also provide the user access to an additional bar that displays statistics such as how many web page or other web-accessible document views have been processed, how many web pages or other web-accessible documents have yielded relevant data, a summary of how much relevant data has been collected and other statistical information). The scope of protection sought is to be limited only by the scope of the appended claims that are intended to suitably cover the invention.

We claim:

1. A system for automatically extracting data from at least one electronic document in any of a plurality of formats, said at least one electronic document including a target page being accessible over a computer network, said target page comprising a plurality of elements each having a contents or structural definition, wherein said structural definition interrelates said plurality of elements, said system comprising:
   a navigation module to record a sequence of actions associated with an initial visit by a user to said target page operable to navigate to said target page of said electronic document;
   an extraction recording module to receive user inputs from said user defining information of interest to said user to be extracted from said plurality of elements of said target page and generating a target pattern for automatically extracting said information of interest to said user from said target page;
   a navigation playback module to automatically access said target page according to said recorded sequence for at least one subsequent visit to said target page; and
   an extraction playback module to automatically identify and scrape select ones of said plurality of elements dependent upon said target pattern for each said at least one subsequent visit to said target page;
   said extraction recording module remapping said target page by re-identifying any modified structural definitions of said plurality of elements thereby to enable access to an altered target page;
   said extraction playback module identifies and scrapes said select ones of said plurality of elements dependent upon said target pattern and said re-identified structural definitions to thereby automatically identify and scrape said select ones of said plurality of elements from said altered target page dependent upon said target pattern;
   wherein information of interest to said user is automatically extracted from said target page for each said at least one subsequent visit to said target page.

2. The system of claim 1 wherein said electronic document is a web site and said target page is a web page or other web-accessible document.

3. The system of claim 1 wherein said contents and structural definitions are specified by a said user through user interaction using an application program interface by filling in forms and activating HTTP links.

4. The system of claim 1 wherein said format comprises a format consisting of one of the group of search engine results, web pages, other web-accessible documents, e-mail, text feeds in any format, HTML, .txt, .pdf, Word, Excel, .ppt, .ftp text feeds, databases and XML.

5. The system of claim 1, further comprising:
   a script for altering said sequence of actions, thereby generating a second sequence of actions; and wherein said navigation playback module automatically executes said second sequence of actions, thereby accessing a second target page and automatically identifies and scrapes select ones of said plurality of elements from said second target page dependent upon said target pattern.

6. The system of claim 1 wherein:
   said extraction recording module automatically accesses said target page according to said recorded sequence and remaps said target page by re-identifying said structural definitions of said plurality of elements;
   said extraction playback module automatically identifies and scrapes select ones of said plurality of elements dependent upon said target pattern and said re-identified structural definitions; and
   said select ones of said plurality of elements are compared to predicted results to determine whether said mapping is functioning properly.

7. The system of claim 1, further comprising:
   means for generating at least one file including data indicative of said actions and said target pattern; and
   means for storing said at least one file so as to be accessible over said computer network.

8. The system of claim 7 wherein said file is in XML format.

9. The system of claim 1 wherein said computer network includes a global interconnection of computer networks.

10. The system of claim 1 wherein said extraction recording module ignores some of said structural definitions in identifying said target pattern.

11. The system of claim 1 wherein said modules are plug-ins in a browser.

12. A method for automatically extracting data from a target page of at least one electronic document being accessible over a computer network, said target page comprising a plurality of elements each having a contents or structural definition wherein said structural definitions interrelate said plurality of elements, said method comprising:

recording a sequence of actions associated with an initial visit to said target page by a user operable to electronically navigate to said target page of said electronic document;

receiving user inputs defining a user selected subset of said plurality of elements to be extracted based on at least one of said contents and structural definitions;

generating a target pattern to identify said user selected subset of said plurality of elements to be extracted in subsequent visits to said target page;

automatically accessing said target page according to said recorded sequence for at least one subsequent visit to said target page;

automatically identifying and scraping a subset of select ones of said plurality of elements dependent upon said target pattern for each said at least one subsequent visit;

remapping said target page by re-identifying any modified structural definitions of said plurality of elements thereby to enable access to an altered target page; and identifying and scraping said select ones of said plurality of elements dependent upon said target pattern and said re-identified structural definitions to thereby automatically identify and scrape said select ones of said plurality of elements from said altered target page dependent upon said target pattern;

wherein information of interest to said user is automatically extracted from said target page for each said at least one subsequent visit to said target page.

13. The method of claim 12 wherein:

in a first mode, said target pattern is dependent upon said interrelation of said structural definitions for said select subset;

in a second mode, said target pattern is dependent upon contents of said select subset;

in a third mode, said target pattern is dependent upon said structural definitions for and contents of said select subset; and in a fourth mode, said pattern is dependent upon formatting of said select subset; and in a fifth mode, said pattern is dependent upon said structural definitions for, contents of and formatting of said select subset.

14. The method of claim 12 wherein said actions include user interaction with a plurality of electronic documents.

15. The method of claim 14 wherein each of said plurality of electronic documents comprises a web page or other web-accessible electronic document.

16. The method of claim 15 wherein said actions include activating HTTP links and electronically filling in and submitting forms.

17. The method of claim 12 wherein said format comprises a format consisting of one of the group of search engine results, web pages, other web-accessible documents, e-mail, text feeds in any format, HTML, .txt, pdf, Word, Excel, ppt, ftp text feeds, databases and XML.

18. The method of claim 12, further comprising the step of: applying XML tags to said scraped subset of select ones of said plurality of elements.

19. A computerized system for automatically scraping select data from a web site, data associated with said web site including a plurality of elements each having contents or structural data associated therewith, and being stored an a server being accessible through the Internet or other computer network, said contents and structural data and elements defining a select web page or other web-accessible document of said web site, said system comprising:

a navigation module being operable on a microprocessor-based device electronically coupled to the Internet or other computer network, said navigational module being operable to:

record a sequence of actions of a user operable to electronically navigate to said select web page or other web-accessible document of said web site using the Internet or other computer network; and automatically access said select web page or other web-accessible document according to said recorded sequence for at least one subsequent visit to said select web page or other web-accessible document of said web site; and an extraction module being operable on said microprocessor-based device, said extraction module being operable to:

receive user inputs identifying information of interest and generating a pattern for a select subset of said plurality of elements on said select web page or other web-accessible document for extracting said information of interest to said user;

automatically identify and scrape select ones of said plurality of elements of said select web page, or other web-accessible document dependent upon said pattern for each said at least one subsequent visit to said select web page or other web-accessible document;

remap said web page or other web-accessible document by re-identifying any modified structural definitions of said plurality of elements thereby to enable access to an altered web page or other web-accessible document; and identify and scrape said select ones of said plurality of elements dependent upon said pattern and said re-identified structural definitions to thereby automatically identify and scrape said select ones of said plurality of elements from said altered web page or other web-accessible document dependent upon said pattern;

wherein information of interest to said user is automatically extracted in each said at least one subsequent visit to said target page.

20. The system of claim 19 wherein said microprocessor-based device includes a browser and said modules are operable through browser software.

21. The system of claim 20 wherein said modules and browser software are mutually responsive to one another.

22. The system of claim 19 wherein:

in a first mode, said pattern is dependent upon said interrelation of said structural definitions for said select subset;

in a second mode, said pattern is dependent upon contents of said select subset;

in a third mode, said pattern is dependent upon said structural definitions for and contents of said select subset;

in a fourth mode, said pattern is dependent upon formatting of said select subset; and in a fifth mode, said pattern is dependent upon said structural definitions for, contents of and formatting of said select subset.

23. The system of claim 19 wherein:

said navigation module is adapted to automatically alter said sequence of actions according to predetermined criteria and automatically access other web pages or other web-accessible documents according to said altered sequence; and said extraction module is adapted to automatically alter said pattern according to predetermined criteria and automatically identify and scrape other select ones of said plurality of elements of said other web pages or other web-accessible documents dependent upon said altered pattern.

24. A system for automatically extracting data from at least one electronic document accessible over a computer network, comprising:

a navigation module to record a navigation path to a target page selected by a user, said target page comprising a plurality of elements each having a contents or structural definition, wherein said structural definition interrelates said plurality of elements;

an extraction recording module receiving at least one user input for identifying information of interest on said target page to be extracted and generating a target pattern for extracting said information of interest;

a navigation playback module to automatically access said target page according to said navigation path for at least one subsequent visit to said target page;

an extraction playback module using said target pattern to extract said information of interest from said target page for each said at least one subsequent visit to said target page;

said extraction recording module remapping said target page by re-identifying any modified structural definitions of said plurality of elements thereby to enable access to an altered target page; and said extraction playback module identifies and scrapes said select ones of said plurality of elements dependent upon said target pattern and said re-identified structural definitions to thereby automatically identify and scrape said select ones of said plurality of elements from said altered target page dependent upon said target pattern;

wherein information of interest to said user is automatically extracted from said target page in each said at least one subsequent visit to said target page.

25. The system of claim 24 wherein said electronic document is a web site and said target page is a web page or other web-accessible document.

26. The system of claim 24 wherein:

said target page comprises a plurality of elements each having a contents or structural definition, wherein said structural definition interrelates said plurality of elements;

said extraction recording module remaps said target page by re-identifying any modified structural definitions of said plurality of elements thereby to enable access to an altered target page; and said extraction playback module identifies and scrapes said select ones of said plurality of elements dependent upon said target pattern and said re-identified structural definitions to thereby automatically identify and scrape said select ones of said plurality of elements from said altered target page dependent upon said target pattern.

27. The system of claim 24 wherein:

said target page comprises a plurality of elements each having a contents or structural definition, wherein said structural definition interrelates said plurality of elements;

said extraction recording module automatically-accesses said target page according to said navigation path and remaps said target page by re-identifying said structural definitions of said plurality of elements;

said extraction playback module automatically identifies and scrapes select ones of said plurality of elements dependent upon said target pattern and said re-identified structural definitions; and said select ones of said plurality of elements are compared to predicted results to determine whether said mapping is functioning properly.

28. A method for automatically extracting data from an electronic document being accessible over a computer network, comprising:

in an initial visit by a user to a target page of said electronic document, recording a navigation path to said target page and receiving at least one user input defining information of interest to said user in said target page to be extracted, said target page comprising a plurality of elements each having a contents or structural definition, wherein said structural definition interrelates said plurality of elements;

generating a target pattern for extracting said information of interest from said target page;

automatically accessing said target page according to said navigation path to return to said target page for at least one subsequent visit;

for each subsequent visit to said target page, extracting information from said target page based on said target pattern, said extracting information including remapping said target page by re-identifying any modified structural definitions of plurality of elements thereby to enable access to an altered target page and identifying and scraping said select ones of said plurality of elements dependent upon said target pattern and said re-identified structural definitions to thereby automatically identify and scrape said select ones of said plurality of elements from said altered target page dependent upon said target pattern;

wherein information of interest to said user is automatically extracted from said target page for each said at least one subsequent visit.

29. The method of claim 28 further comprising: providing a graphical user interface for said user to input said at least one user input defining information of interest.

30. The method of claim 28, further comprising: providing a graphical user interface for said user to select said target page, monitor said user's navigation to said target page, and for said user to define information of interest on said target page.

31. The method of claim 28, further comprising: providing a graphical user interface for said user to input user preferences for a subset of a plurality of elements on said target page to be scraped.

32. The method of claim 28 wherein said extracting information comprises: scraping a subset of elements from said target page.

33. The method of claim 28 wherein generating said target pattern includes: analyzing at least one of a structural attribute, a content attribute, and a formatting attribute associated with each element of said target page selected by said user.

34. The method of claim 28, further comprising: storing extracted information in a repository.

35. The method of claim 28, further comprising: formatting extracted information into a standard data format, thereby generated formatted extracted data.

36. The method of claim 35, further comprising: exporting said formatted extracted data into a software application specified by said user.

37. The method of claim 35, further comprising: processing said formatted extracted data according to a process selected by said user.

38. The method of claim 28, wherein said automatically accessing comprises periodically visiting said target page.

39. A computer implemented method for automatically extracting data from an electronic document being accessible over a computer network, comprising:

provifding a graphical user interface for a user to identify a web page as a target page, said target page comprising a plurality of elements each having a contents or structural definition, wherein said structural definition interrelates said plurality of elements;

recording a navigation path to said target page;

providing a user interface for said user to identify a subset of a plurality of elements of said target page as being information of interest to said user to be extracted;

generating a target pattern for extracting said information of interest from said target page;

automatically accessing said target page according to said navigation path for at least one return visit to said target page;

for each return visit to said target page, extracting information from said target page based on said target pattern, said extracting information including remapping said target page by re-identifying any modified structural definitions of said plurality of elements thereby to enable access to an altered target page and identifying and scraping said select ones of said plurality of elements dependent upon said target pattern and said re-identified structural definitions to thereby automatically identify and scrape said select ones of said plurality of elements from said altered target page dependent upon said target pattern; and transforming said extracted information into a standard format for further processing;

wherein information of interest to said user is automatically extracted from said target page and transformed into a format suitable for use by at least one other software application for each said at least one return visit to said target page.

40. The method of claim 39, further comprising: storing said extracted information in said standard format into a repository.

41. The method of claim 39, further comprising: importing said extracted information in said standard format into a software application specified by said user.

42. The method of claim 40, wherein said automatically accessing comprises: periodically returning to said target web page, whereby information of interest is periodically extracted.

43. The method of claim 41, wherein said automatically accessing comprises: periodically returning to said target web page, whereby information of interest is periodically extracted.

* * * * *